(12) United States Patent
Mizutani et al.

(10) Patent No.: US 10,409,244 B2
(45) Date of Patent: Sep. 10, 2019

(54) CONTROLLER AND CONTROL METHOD

(71) Applicant: OMRON Corporation, Kyoto-shi, Kyoto (JP)

(72) Inventors: Seiji Mizutani, Moriyama (JP); Masaichi Takai, Ritto (JP); Haedon Lee, Kobe (JP)

(73) Assignee: OMRON Corporation, Kyoto-shi (JP)

( * ) Notice: Subject to any disclaimer, the term of this patent is extended or adjusted under 35 U.S.C. 154(b) by 322 days.

(21) Appl. No.: 15/028,961

(22) PCT Filed: Oct. 15, 2014

(86) PCT No.: PCT/JP2014/077397
§ 371 (c)(1),
(2) Date: Apr. 13, 2016

(87) PCT Pub. No.: WO2015/056695
PCT Pub. Date: Apr. 23, 2015

(65) Prior Publication Data
US 2016/0266563 A1 Sep. 15, 2016

(30) Foreign Application Priority Data
Oct. 15, 2013 (JP) .................................. 2013-214829

(51) Int. Cl.
*G04C 13/08* (2006.01)
*G05B 19/042* (2006.01)
*G05B 19/05* (2006.01)

(52) U.S. Cl.
CPC ......... *G05B 19/0421* (2013.01); *G05B 19/05* (2013.01); *G05B 2219/2231* (2013.01)

(58) Field of Classification Search
CPC ................ G05B 19/0421; G05B 19/05; G05B 2219/2231
See application file for complete search history.

(56) References Cited

U.S. PATENT DOCUMENTS 5,481,456 A * 1/1996 Ogura ................. B60R 16/0315
477/97
5,944,840 A 8/1999 Lever
(Continued)

FOREIGN PATENT DOCUMENTS

CN 1860427 A 11/2006
CN 101755419 A 6/2010
(Continued)

OTHER PUBLICATIONS

Chinese Office action dated May 27, 2017 in the counterpart Chinese patent application.

*Primary Examiner* — Cuong B Nguyen
*Assistant Examiner* — Samuel Park
(74) *Attorney, Agent, or Firm* — Metrolex IP Law Group, PLLC

(57) ABSTRACT

A controller constituting at least a portion of a control system includes a master control unit, and one or more slave control units connected to the master control unit with at least a communication line. The slave control units each include a timer that is synchronized with the master control unit, an input unit that receives an interrupt signal, a notification unit that obtains, upon receipt of the interrupt signal through the input unit, timing information from the timer and transmits notification about an input of the interrupt signal to the master control unit, and a transmission unit that transmits, upon receipt of a request from the master control unit via the communication line, the timing information to the master control unit via the communication line.

9 Claims, 13 Drawing Sheets

(56) References Cited

U.S. PATENT DOCUMENTS

| | | | |
|---|---|---|---|
| 2003/0041274 A1* | 2/2003 | Platteter | G06F 1/14 |
| | | | 713/400 |
| 2005/0091554 A1 | 4/2005 | Loukianov | |
| 2008/0294926 A1 | 11/2008 | Eshraghian et al. | |
| 2014/0089546 A1 | 3/2014 | Machnicki et al. | |

FOREIGN PATENT DOCUMENTS

| | | |
|---|---|---|
| CN | 101826000 A | 9/2010 |
| JP | 2011-086120 A | 4/2011 |
| JP | 2012-010216 A | 1/2012 |
| WO | 2005017724 A2 | 2/2005 |

\* cited by examiner

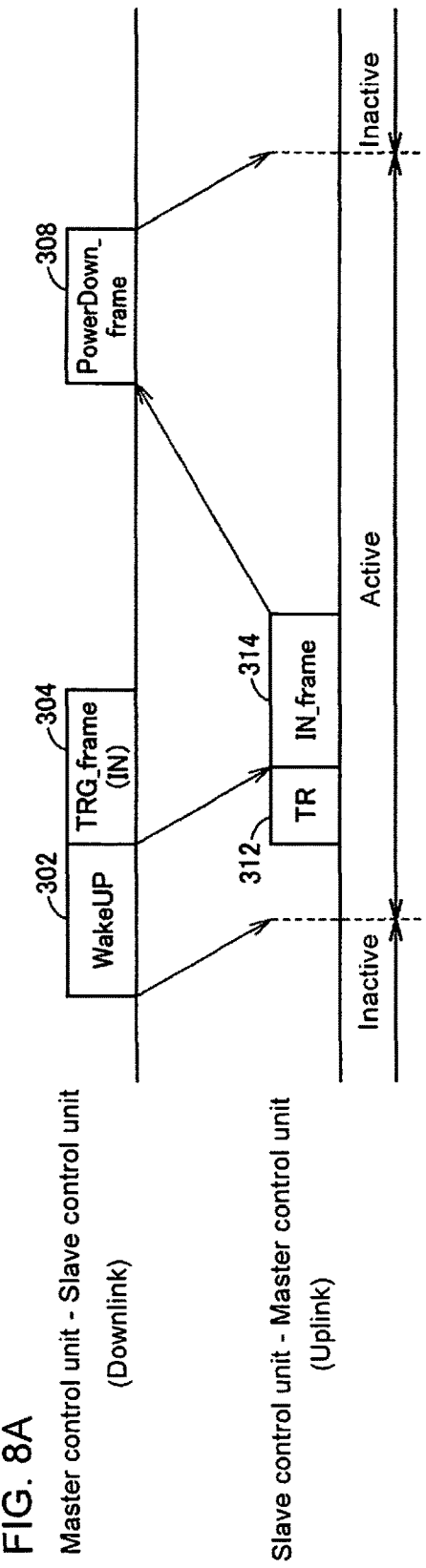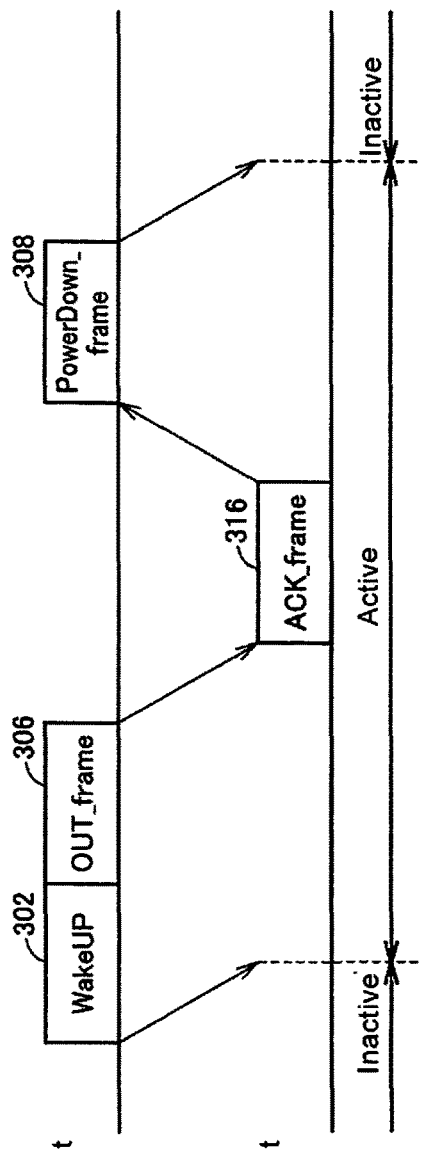

CONTROLLER AND CONTROL METHOD

FIELD

The present invention relates to a controller constituting at least a portion of a control system for controlling the operations of machines or equipment, and to a control method used in the controller.

BACKGROUND

Machines or equipment used at many production sites are typically controlled by control systems including controllers, such as programmable logic controllers (PLCs). A control system includes an input-output (IO) unit that receives an input signal from an external switch or sensor and outputs a signal to an external relay or actuator.

To satisfy control specifications, the control system has a variety of interrupts, including an IO interrupt, a shutdown interrupt, and a periodic interrupt. An IO interrupt implements interrupt processing in response to an input signal received from an external source. A shutdown interrupt implements interrupt processing in response to shutdown of power supplied to, for example, a PLC. A periodic interrupt implements interrupt processing executed in every predetermined period.

As techniques associated with interrupts, for example, Japanese Unexamined Patent Application Publication No. 2012-010216 (Patent Literature 1) describes an interrupt system including a host device and a peripheral device connected to each other with a network. Japanese Unexamined Patent Application Publication No. 2011-086120 (Patent Literature 2) describes a serial bus controller that transmits an interrupt signal for implementing a synchronization process to each relevant device at the same timing to reduce jitter of such interrupt signals for synchronization.

CITATION LIST

Patent Literature

Patent Literature 1: Japanese Unexamined Patent Application Publication No. 2012-010216
Patent Literature 2: Japanese Unexamined Patent Application Publication No. 2011-086120

SUMMARY

Technical Problem

To cause an IO interrupt using, for example, an interrupt signal input into the IO unit, the interrupt signal input into the IO unit is to be transferred to a unit responsible for main computation with a bus or a network. The time taken to transmit the interrupt signal may affect execution of a user program.

Patent Literature 1 describes a method for transmitting an interrupt signal, without referring to the input timing of an interrupt signal. Patent Literature 2 describes a system for transmitting an interrupt signal for implementing a synchronization process to each relevant device at the same timing. However, this system transmits an interrupt signal to a plurality of devices, and thus increases the amount of signal transmission. The demand is increasing for controllers that can more flexibly control the execution timing of various programs executed in response to interrupts.

Solution to Problem

A first aspect of the present invention provides a controller constituting at least a portion of a control system. The controller includes a master control unit, and one or more slave control units connected to the master control unit with at least a communication line. The slave control units each include a timer that is synchronized with the master control unit, an input unit that receives an interrupt signal, a notification unit that obtains, upon receipt of the interrupt signal through the input unit, timing information from the timer and transmits notification about an input of the interrupt signal to the master control unit, and a transmission unit that transmits, upon receipt of a request from the master control unit via the communication line, the timing information to the master control unit via the communication line.

In some embodiments, the master control unit and the slave control units are connected to one another further with an interrupt line. The slave control units transmit notification about the input of the interrupt signal to the master control unit via the interrupt line.

In some embodiments, the slave control units transmit information indicating the input of the interrupt signal to the master control unit via the communication line.

In some embodiments, the master control unit periodically transmits an inquiry to the slave control units via the communication line. When at least one of the slave control units has previously received the interrupt signal at reception of the inquiry from the master control unit, the at least one slave control unit transmits information indicating the input of the interrupt signal to the master control unit.

In some embodiments, the communication line includes a downlink to transmit data from the master control unit to the slave control units, and an uplink to transmit data from the slave control units to the master control unit. The master control unit includes a transmission unit that transmits a command for deactivating the uplink to the slave control units via the downlink upon completion of data transmission from the slave control units via the uplink, and a transmission unit that transmits a command for activating the uplink to the slave control units via the downlink upon receipt of notification about an input of the interrupt signal from the slave control units.

In some embodiments, the controller includes a plurality of the slave control units. The controller further includes a control unit that limits slave control units that are enabled to transmit notification about the input of the interrupt signal to the master control unit.

In some embodiments, the request transmitted from the master control unit via the communication line is received by limited slave control units that are enabled to transmit notification about the input of the interrupt signal to the master control unit.

In some embodiments, each of the slave control units includes an OR circuit arranged on the interrupt line to output, as a notification signal indicating an input of a new interrupt signal, a logical sum of a notification signal indicating an input of an interrupt signal received from a preceding one of the slave control units, and a notification signal indicating an input of an interrupt signal in the slave control unit including the OR circuit, and a circuit that determines whether to output the notification signal indicating the input of the new interrupt signal received from the OR circuit to a subsequent one of the slave control units.

Another aspect of the present invention provides a control method implemented in a control system including a master control unit and one or more slave control units connected to the master control unit with at least a communication line. The method includes obtaining, when one of the slave control units receives an interrupt signal through an input unit, timing information from a timer that is synchronized with the master control unit and transmitting notification about an input of the interrupt signal to the master control unit, and transmitting the obtained timing information to the master control unit via the communication line when one of the slave control units receives a request from the master control unit via the communication line.

Advantageous Effects

The controller according to one or more embodiments of the present invention controls, for example, the execution timing of various programs in interrupt processing in a more flexible manner.

BRIEF DESCRIPTION OF THE DRAWINGS

FIGS. 8A and 8B are timing charts showing an example procedure for reducing power consumption in the PLC system according to the embodiment of the present invention.

DETAILED DESCRIPTION

Figure 1:
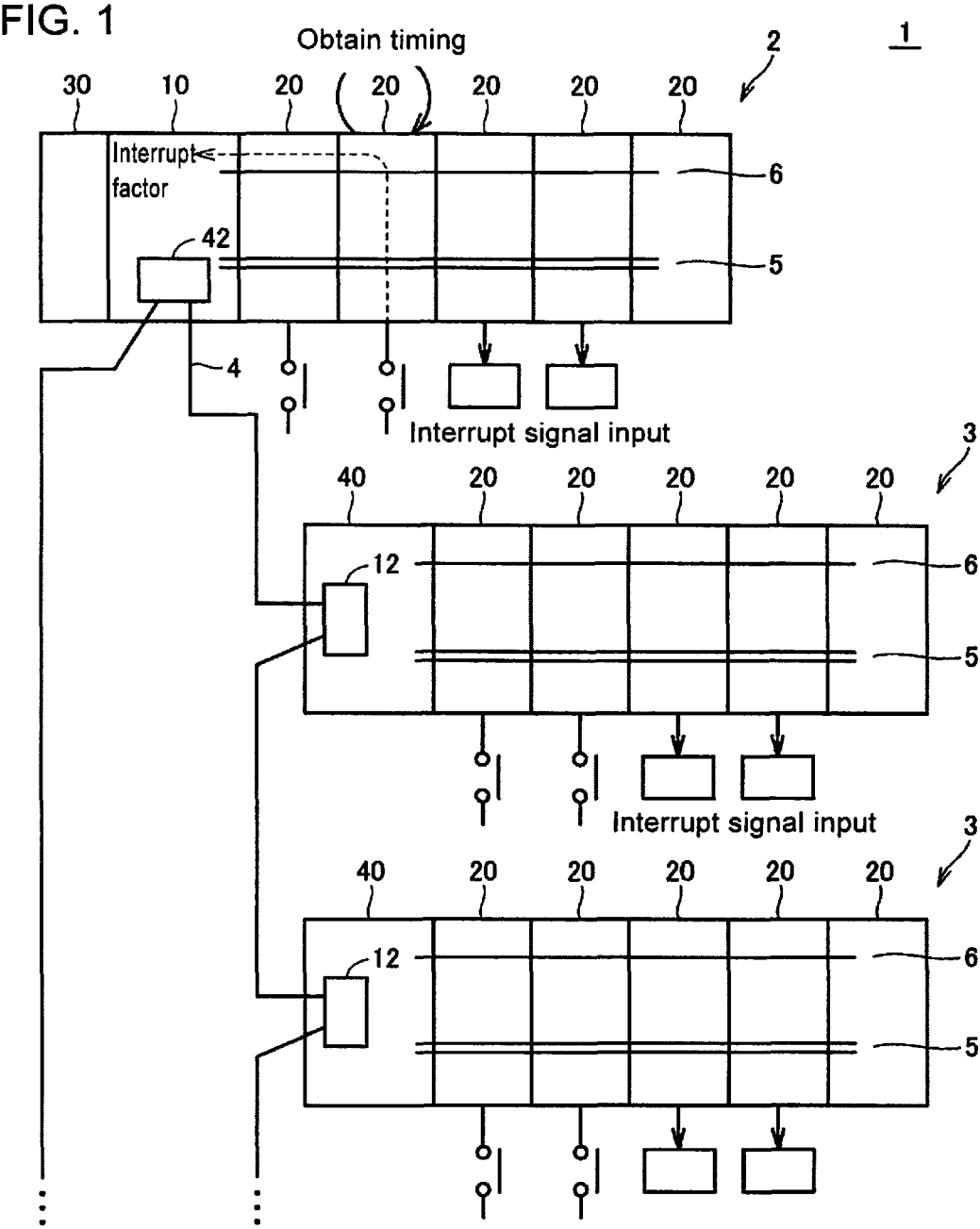
FIG. 1 is a schematic diagram showing the overall configuration of a PLC system according to one embodiment of the present invention.

Embodiments of the present invention will now be described with reference to the drawings. The same components or corresponding components are given the same reference numerals in the figures, and will not be described redundantly.

A control system according to the present embodiment mainly includes programmable logic controllers (PLCs) (PLC system). However, the control system may not be a PLC system but may be a system mainly including various industrial computers. The system may use a new processing device (computation device) that may emerge after technological advancements.

A. Overall Configuration of the PLC System

The overall configuration of the PLC system according to the present embodiment will now be described. FIG. 1 is a schematic diagram showing the overall configuration of the PLC system 1 according to the present embodiment.

Referring now to FIG. 1, the PLC system 1 includes a main processing device 2 and one or more remote IO devices 3. The main processing device 2 and the remote IO devices 3 are controllers that each constitute at least a portion of the PLC system 1. The main processing device 2 is connected to the remote IO devices 3 with a field bus 4. Each remote IO device 3 includes a communication module 12 for its connection to the field bus 4.

The main processing device 2 executes control programs (including user programs and system programs) to calculate an output signal to an external relay or actuator in response to an input signal transmitted from an external switch or sensor. More specifically, the main processing device 2 includes a CPU unit 10, IO units 20, and a power supply unit 30. The CPU unit 10 and the IO units 20 are connected to one another with an internal bus 5 to allow data communication between them. The power supply unit 30 supplies power at an appropriate voltage to the CPU unit 10 and the IO units 20.

The CPU unit 10 is responsible for main computation, and includes a processor and a main memory for executing a control program. The CPU unit 10 includes a communication module 42 for transmitting and receiving data between the remote IO devices 3 via the field bus 4. The field bus 4 may use a communication scheme that allows communication in every predetermined control period (communication at real time).

Each remote IO device 3 receives an input signal from an external switch or sensor, and then transmits the received input signal to the main processing device 2 via the field bus 4, and transmits a signal received from the main processing device 2 via the field bus 4 to an external relay or actuator. More specifically, each remote IO device 3 includes a master unit 40 and one or more IO units 20. The master unit 40 and the IO units 20 are connected to one another with the internal bus 5 to allow data communication between them.

The master unit 40 mainly controls the operations of the IO units 20 (e.g., the update timing of IO data), and also controls data communication with the main processing device 2.

The IO units 20 are capable of performing common input and output processing in addition to data communication with the CPU unit 10 or the master unit 40 via the internal bus 5. More specifically, the IO units 20 receive an input signal from an external switch or sensor and/or output a signal to an external relay or actuator.

Typically, the IO units 20 receive input binary data such as ON or OFF data, or output such binary data. For example, the IO units 20 collect information indicating that an object is being detected (ON) or no object is being detected (OFF)

from a detection sensor. The IO units 20 also transmit a command for activating a target (ON command) or a command for deactivating a target (OFF command) to an output destination, such as a relay or an actuator. Each IO unit 20 may perform both input processing and output processing, or some IO units 20 may be dedicated to input processing (input units), and other IO units may be dedicated to output processing (output units).

B. Interrupt Processing in PLC System

In the main processing device 2, the CPU unit 10 corresponds to a master control unit and each IO unit 20 corresponds to a slave control unit. In the remote IO device 3, the master unit 40 corresponds to a master control unit and each IO unit 20 corresponds to a slave control unit. In other words, each of the CPU unit 10 and the master unit 40, which is a master control unit, is connected to one or more IO units 20 via the internal bus 5, which is a communication line.

In the PLC system 1, the slave control unit receives an interrupt signal for an IO interrupt and the master control unit receives the interrupt signal from the slave control unit via an IRQ bus 6. More specifically, the main processing device 2 and the remote IO device 3 each include an IRQ bus 6, which is an interrupt line for transmitting an interrupt input. In other words, the main processing device 2 and the remote IO device 3 are connected each other with an interrupt line.

The PLC system 1 includes the IRQ bus 6 for transmitting an interrupt signal, in addition to the internal bus 5 for transmitting and receiving data between the IO units 20 and the CPU unit 10 or the master unit 40. These two different buses are combined to perform interrupt processing.

In the PLC system 1, the timing when an interrupt signal is input can be obtained and can be used. More specifically, when receiving an interrupt signal, the IO unit 20 obtains information indicating the input timing from a timer, and transmits notification about the input of the interrupt signal to the master control unit (the CPU unit 10 or the master unit 40) via the IRQ bus 6, which is an interrupt line. Subsequently, when receiving a request from the master control unit (the CPU unit 10 or the master unit 40) via the internal bus 5, the IO unit 20 transmits information indicating the obtained timing to the master control unit via the internal bus 5. The master control unit (the CPU unit 10 or the master unit 40) performs processing for various interrupts based on the timing when an interrupt signal is input from the IO unit 20.

C. Hardware Configuration of the PLC System

Figure 2:
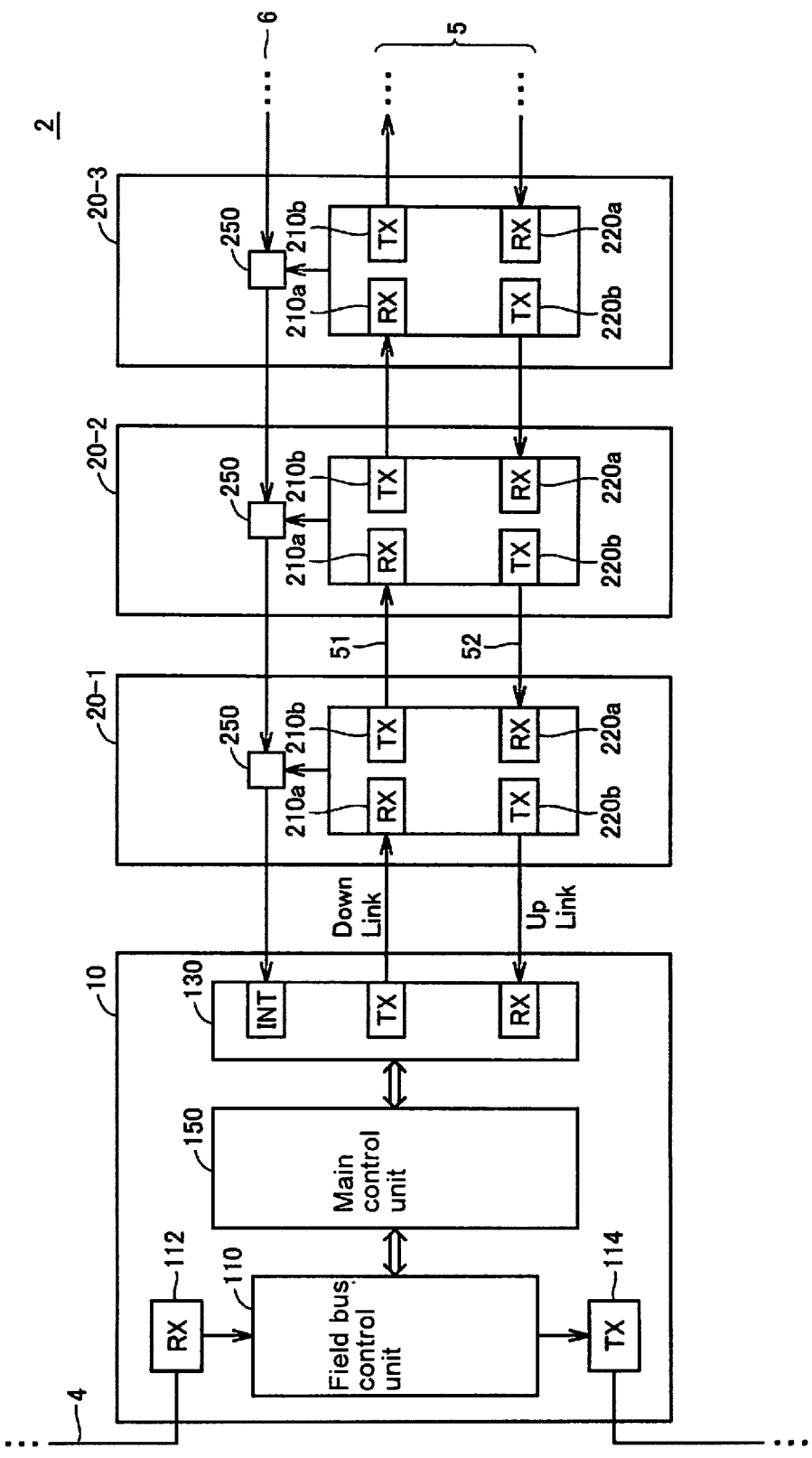
FIG. 2 is a schematic diagram showing the connection in a main processing device according to the embodiment of the present invention.

The hardware configuration for the components of the PLC system 1 will now be described.
c1: Connection
FIG. 2 is a schematic diagram showing the connection in the main processing device 2 according to the present embodiment. The connection in each remote IO device 3 is the same as the connection in the main processing device 2. The same explanation for the CPU unit 10 applies to the master unit 40.

Referring now to FIG. 2, the main processing device 2 includes the CPU unit 10 and one or more IO units 20-1, 20-2, and 20-3 (these units may hereafter be collectively referred to as IO units 20), which are connected to one another with the internal bus 5 (a downlink 51 and an uplink 52), which is a communication line, to allow data communication between them. The CPU unit 10 and the IO units 20 are also connected to one another via the IRQ bus 6.

The IRQ bus 6 is an interrupt line for transmitting an interrupt signal input into any of the IO units 20 to the CPU unit 10. Although the IRQ bus 6 may also carry information about an input of an interrupt signal in accordance with a predetermined protocol, the IRQ bus 6 in the present embodiment is designed to carry only information about a signal change indicating ON or OFF. The IRQ bus 6 is a wired bus.

When detecting an input of an interrupt signal, each IO unit 20 transmits a signal for notifying the detected input to its subsequent IO unit via the IRQ bus 6. When receiving notification about an input of an interrupt signal from an adjacent other IO unit 20 via the IRQ bus 6, each IO unit 20 retransmits (forwards) the interrupt signal to its subsequent IO unit. When the IO unit 20 has previously received an input interrupt signal, the IO unit 20 superimposes the previously received interrupt signal onto the currently received interrupt signal, and transmits the resultant signal to the subsequent IO unit. Each IO unit 20 includes an interrupt notification circuit 250, which sequentially transfers notification about an input of an interrupt signal. The interrupt notification circuit 250 will be described in detail later.

The internal bus 5 may have any configuration to allow data transmission and reception between the master control unit (CPU unit 10) and the IO units 20. In the present embodiment, the internal bus 5 uses daisy-chain connection, which includes independent links in different directions of data transmission. More specifically, the internal bus 5 has a master-slave configuration, and includes a communication channel including the downlink (Down Link, or DL) 51 and the uplink (Up Link, or UL) 52 as a pair. The downlink 51 is used to transmit data from the master control unit to the slave control unit, whereas the uplink 52 is used to transmit data from the slave control unit to the master control unit. The communication channel may include a single communication channel (one pair) or more channels.

In one example, the downlink 51 and the uplink 52 use serial communication, and thus transmit target data sequentially as time-series data. More specifically, data on the downlink 51 is transmitted in one direction from the master control unit (CPU unit 10) toward the corresponding slave control unit (IO unit 20), whereas data on the uplink 52 is transmitted in one direction from one slave control unit (IO unit 20) toward the master control unit (CPU unit 10).

When receiving a signal sequence transmitted on either the downlink 51 or the uplink 52, each IO unit 20 decodes the signal sequence, and subjects the resultant data to intended processing. Each IO unit 20 reconstructs the signal sequence, and retransmits (forwards) the reconstructed signal sequence to its subsequent IO unit 20. To allow such sequential transfer of data, each IO unit 20 includes a reception unit (hereafter, RX) 210a and a transmission unit (hereafter, TX) 210b on the downlink 51, and a reception unit 220a and a transmission unit 220b on the uplink 52.
c2: Hardware Configuration of the CPU Unit 10
The hardware configuration of the CPU unit 10 will now be described.

Referring now to FIG. 2, the CPU unit 10 includes a main control unit 100, a field bus control unit 110, a reception unit 112, a transmission unit 114, and an internal bus control unit 130. The CPU unit 10, which is connected to the internal bus 5 (the downlink 51 and the uplink 52) and the IRQ bus 6, is also connected to the field bus 4 through the reception unit 112 and the transmission unit 114.

The field bus control unit 110 controls data communication via the field bus 4. The internal bus control unit 130 controls data communication via the internal bus 5 and the IRQ bus 6. The main control unit 100 executes control programs (including user programs and system programs), while transmitting and receiving data between the field bus control unit 110 and the internal bus control unit 130.

Figure 3:
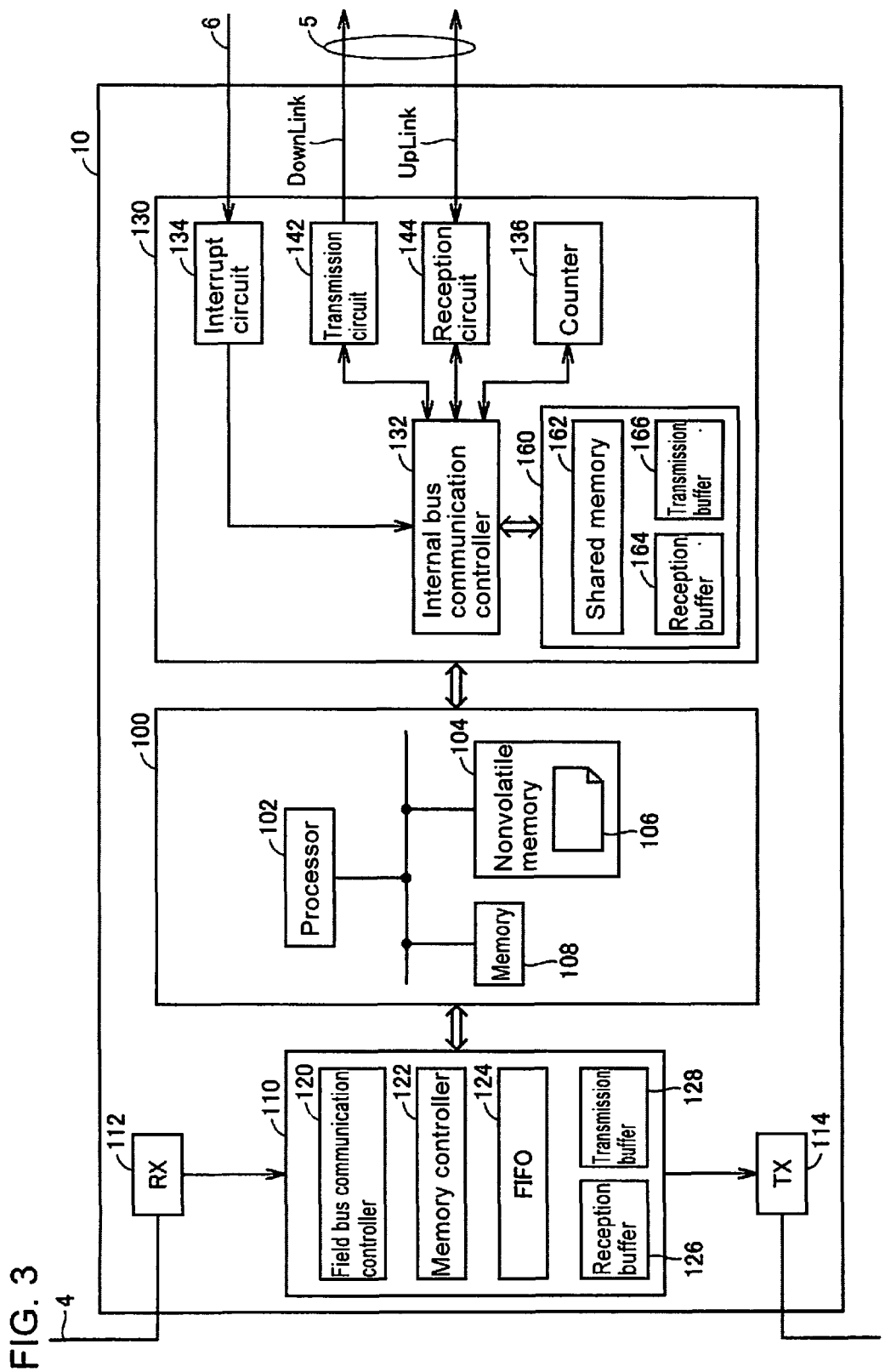
FIG. 3 is a schematic diagram showing the hardware configuration of a CPU unit included in the main processing device according to the embodiment of the present invention.

The hardware configuration of the CPU unit 10 will now be described in detail with reference to FIG. 3. FIG. 3 is a schematic diagram showing the hardware configuration of the CPU unit 10 included in the main processing device 2 according to the present embodiment.

The field bus control unit 110 included in the CPU unit 10 transmits and receives data to and from other devices via the field bus 4 in every predetermined control period in cooperation with the reception unit 112 and the transmission unit 114. More specifically, the field bus control unit 110 includes a field bus communication controller 120, a memory controller 122, a first-in first-out (FIFO) memory 124, a reception buffer 126, and a transmission buffer 128.

The field bus communication controller 120 may interpret a command transmitted via the field bus 4, and perform processing for communication via the field bus 4. The field bus communication controller 120 copies data from upper communication frames that are stored sequentially into the FIFO memory 124, and writes data into the upper communication frames.

The memory controller 122 is a control circuit that enables functions including direct memory access (DMA). The memory controller 122 controls writing and reading of data to and from the FIFO memory 124, the reception buffer 126, and the transmission buffer 128.

The FIFO memory 124 temporarily stores upper communication frames received via the field bus 4, and sequentially outputs the upper communication frames in the order in which they are stored. The reception buffer 126 extracts data showing the status value (hereafter, OUT data) to be output from the output unit of each IO unit 20 connected to the master control unit from the data contained in the upper communication frames stored sequentially in the FIFO memory 124, and temporarily stores the extracted data. The transmission buffer 128 temporarily stores process data showing the status value detected by the input unit of the IO unit 20 and to be written into predetermined areas of upper communication frames that are sequentially stored into the FIFO memory 124.

The main control unit 100 includes a processor 102, a nonvolatile memory 104, and a main memory 108. The processor 102 executes control programs in accordance with a control target. The processor 102 reads a control program 106 from, for example, the nonvolatile memory 104, and expands the program into the main memory 108 and executes the program. The control program 106 is executed to sequentially calculate the status values to be output from the output unit of the IO unit 20 based on the status value detected by the input unit of the IO unit 20.

The main control unit 100 provides an instruction to the field bus control unit 110 and the internal bus control unit 130, and may control data transfer between the field bus control unit 110 and the internal bus control unit 130.

The internal bus control unit 130 transmits and receives data to and from the IO unit 20 via the internal bus 5 (the downlink 51 and the uplink 52) in a control period shorter than the control period for the field bus 4. The internal bus control unit 130 includes an internal bus communication controller 132, an interrupt circuit 134, a counter 136, a transmission circuit 142, a reception circuit 144, and a storage unit 160.

The internal bus communication controller 132 centrally (as a master) controls data communication via the internal bus 5. For example, the internal bus communication controller 132 outputs a data frame including a command (trigger) for requesting IN data from the IO unit 20 (hereafter, TRG_frame(IN)) or a data frame including OUT data to be reflected in the IO unit 20 (hereafter, OUT_frame) onto the internal bus 5 in accordance with an instruction from the main control unit 100. In response to the frame TRG_frame (IN), each IO unit 20 refreshes its input unit, and then forwards a data frame (hereafter, IN_frame) including the status value after the refresh (IN data) via the internal bus 5. The frame TRG_frame(IN) or the frame OUT_frame may be transmitted to a specific IO unit 20, or may be transmitted (multicast or broadcast) to all the IO units 20 connected to the internal bus 5.

When receiving an input interrupt signal via the IRQ bus 6, the interrupt circuit 134 transmits notification about the input of the interrupt signal to the internal bus communication controller 132.

The counter 136 is an example of a timer for measuring various timings, and continues counting up in predetermined cycles. The count value of the counter 136 may be used to obtain timing. The count value of the counter 136 is synchronized with the count value of a counter included in each IO unit 20. The count value provided from any of the IO units 20 is used to perform control based on timing.

The transmission circuit 142 generates data frames that are transmitted on the downlink of the internal bus 5, and transmits the generated frames in accordance with an instruction provided from the internal bus communication controller 132. The reception circuit 144 receives the data frames that are transferred on the uplink of the internal bus 5, and outputs the received frames to the internal bus communication controller 132.

The storage unit 160 corresponds to a buffer memory for storing data transmitted on the internal bus 5. More specifically, the storage unit 160 includes a shared memory 162, a reception memory 164, and a transmission memory 166. The shared memory 162 temporarily stores data transmitted and received between the field bus control unit 110 and the internal bus control unit 130. The reception memory 164 temporarily stores IN data received from the IO unit 20 via the internal bus 5. The transmission memory 166 temporarily stores OUT data included in upper communication frames received by the field bus control unit 110.

c3: Hardware Configuration of the Master Unit 40

Figure 4:
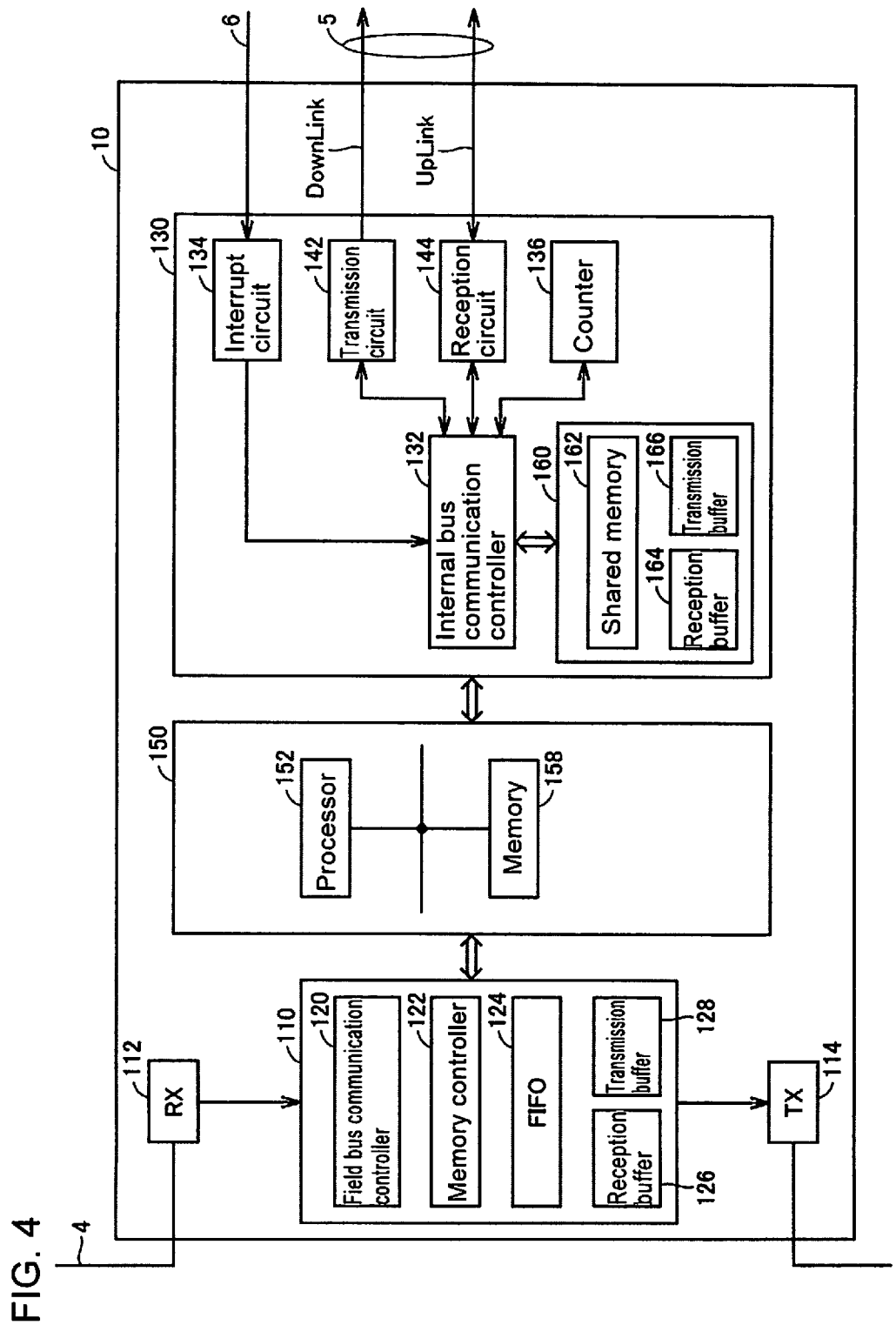
FIG. 4 is a schematic diagram showing the hardware configuration of a master unit included in a remote IO device according to the embodiment of the present invention.

The hardware configuration of the master unit 40 will now be described. FIG. 4 is a schematic diagram showing the hardware configuration of the master unit 40 included in the remote IO device 3 according to the present embodiment.

Referring now to FIG. 4, the master unit 40 differs from the CPU unit 10 in that the master unit 40 includes a main control unit 150 that replaces the main control unit 100. The main control unit 150 does not execute control programs or other programs, and controls data communication via the field bus 4 and data communication with the remote IO devices 3 via the internal bus 5. The main control unit 150 includes a processor 152 and a memory 158.

The basic configuration for data communication in the master unit 40 is the same as the configuration in the CPU unit 10 (FIG. 3) described above. The corresponding components (given the same reference numerals) will not be described redundantly.

c4: Hardware Configuration of the IO Unit 20

Figure 5:
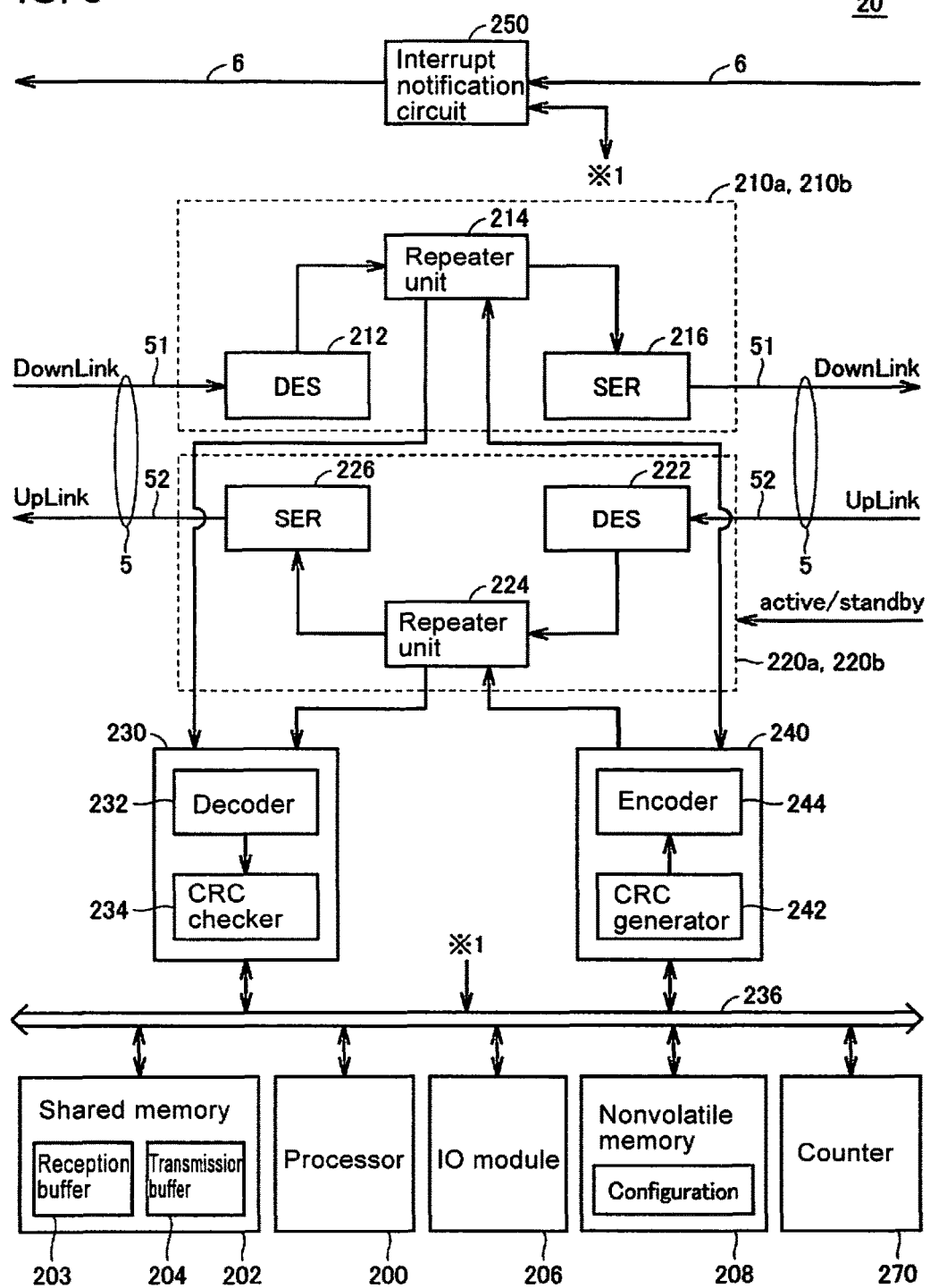
FIG. 5 is schematic diagram showing the hardware configuration of an IO unit included in the PLC system according to the embodiment of the present invention.

The hardware configuration of each IO unit 20 will now be described. FIG. 5 is a schematic diagram showing the hardware configuration of each IO unit 20 included in the PLC system 1 according to the present embodiment.

Referring now to FIG. 5, each IO unit 20 includes de-serializers (hereafter, DES) 212 and 222, serializers (hereafter, SER) 216 and 226, and repeater units 214 and 224.

The DES 212, the repeater unit 214, and the SER 216 correspond to the reception unit 210a and the transmission unit 210b for the downlink 51 shown in FIG. 2. These components perform the processing for transmitting and receiving data (data frames) that are transferred on the downlink 51. In the same manner, the DES 222, the repeater unit 224, and the SER 226 correspond to the reception unit 220a and the transmission unit 220b for the uplink 52 shown in FIG. 2.

Each IO unit 20 further includes a reception processing unit 230, a transmission processing unit 240, a processor 200, a shared memory 202, an IO module 206, a nonvolatile memory 208, an interrupt notification circuit 250, and a counter 270, which are connected to one another with a bus 236.

The reception processing unit 230 performs the processing for receiving data frames transmitted via the downlink 51 and the uplink 52. More specifically, the reception processing unit 230 includes a decoder 232 and a CRC checker 234. The decoder 232 receives a data frame and decodes the data frame using a predetermined algorithm to obtain data. The CRC checker 234 checks error correcting code, such as cyclic redundancy check (CRC), for the decoded data. Data determined normal in checking for errors is output to, for example, the processor 200.

The transmission processing unit 240 performs the processing for transmitting data frames via the downlink 51 and the uplink 52. More specifically, the transmission processing unit 240 is connected to the repeater units 214 and 224. In accordance with an instruction provided from the processor 200, the transmission processing unit 240 controls the configuration of a data frame to be retransmitted (forwarded) to the subsequent IO unit 20 and the timing to retransmit (forward) the data frame. More specifically, the transmission processing unit 240 includes a CRC generator 242 and an encoder 244. The CRC generator 242 calculates a cyclic redundancy check (CRC) for data provided from, for example, the processor 200, and adds the obtained code to the data. The encoder 244 encodes the data provided from the CRC generator 242, and outputs the encoded data to the corresponding repeater unit.

The processor 200 is responsible for main computation, and centrally controls the IO unit 20. The processor 200 stores a data frame received through the reception processing unit 230 into the shared memory 202 by executing, for example, prestored programs, or reads predetermined data from the shared memory 202 and transmits the data to the transmission processing unit 240 to generate a data frame.

The shared memory 202 includes a reception buffer 203, which temporarily stores a data frame received through the reception processing unit 230, and a transmission buffer 204, which temporarily stores a data frame to be transmitted via the transmission processing unit 240. The shared memory 202 further includes an area for storing various data.

The IO module 206 receives an input signal from an external switch or sensor, and writes the signal value into the shared memory 202, and outputs the received signal to an external relay or actuator in accordance with the signal value written in the corresponding area of the shared memory 202. More specifically, the IO module 206 includes at least an input unit for collecting the status values (IN data) of externally input signals, or an output unit for outputting signals with designated status values (OUT data).

The nonvolatile memory 208 stores various data in a nonvolatile manner. More specifically, the nonvolatile memory 208 stores, for example, setup information (configuration) that describes a setting value for each IO unit 20.

When an interrupt signal is input into the IO module 206, the interrupt notification circuit 250 transmits a signal for notifying the input to its subsequent IO unit via the IRQ bus 6. When receiving notification about an input of an interrupt signal from an adjacent other IO unit 20 (interrupt notification circuit 250) via the IRQ bus 6, each IO unit 20 retransmits (forwards) the interrupt signal to its subsequent IO unit.

The counter 270 is an example of a timer for measuring various timings, and is synchronized with the counter 136 included in the CPU unit 10 or the master unit 40, which serves as the master control unit. More specifically, the counter 270 in each IO unit 20 counts up (increments). The master control unit transmits notification about the count value of its internal counter 136 to the IO units 20 via the internal bus 5 in predetermined cycles. The IO unit 20 updates the count value of the counter 270 as appropriate using the count value provided from the master control unit.

The timer may not be the counter 270 but may be implemented with various other methods. For example, the master control unit may broadcast time data via the internal bus 5 in predetermined cycles, and the IO units 20 may obtain the timing when an interrupt factor has occurred based on the broadcast time data.

c5: Others

Although the main control unit 100 of the CPU unit 10, the main control unit 150 of the master unit 40, and the remote IO devices 3 are implemented using processors in the above embodiment, the embodiment is not limited to this structure. For example, these components may be implemented using hardware circuits such as application-specific integrated circuits (ASICs) or field programmable gate arrays (FPGAs) that replace the processors. Some or all of these components may be implemented using software.

For example, the components corresponding to the reception units 210a and 220a and the transmission units 210b and 220b shown in FIG. 2 may be implemented using physical circuits, such as ASICs, and the other components may be implemented using processors executing programs.

The components may be packaged in a single circuit. The components may be implemented in any configuration that can achieve the functions and the processes described herein.

D. Overview of Interrupt Processing

Figure 6:
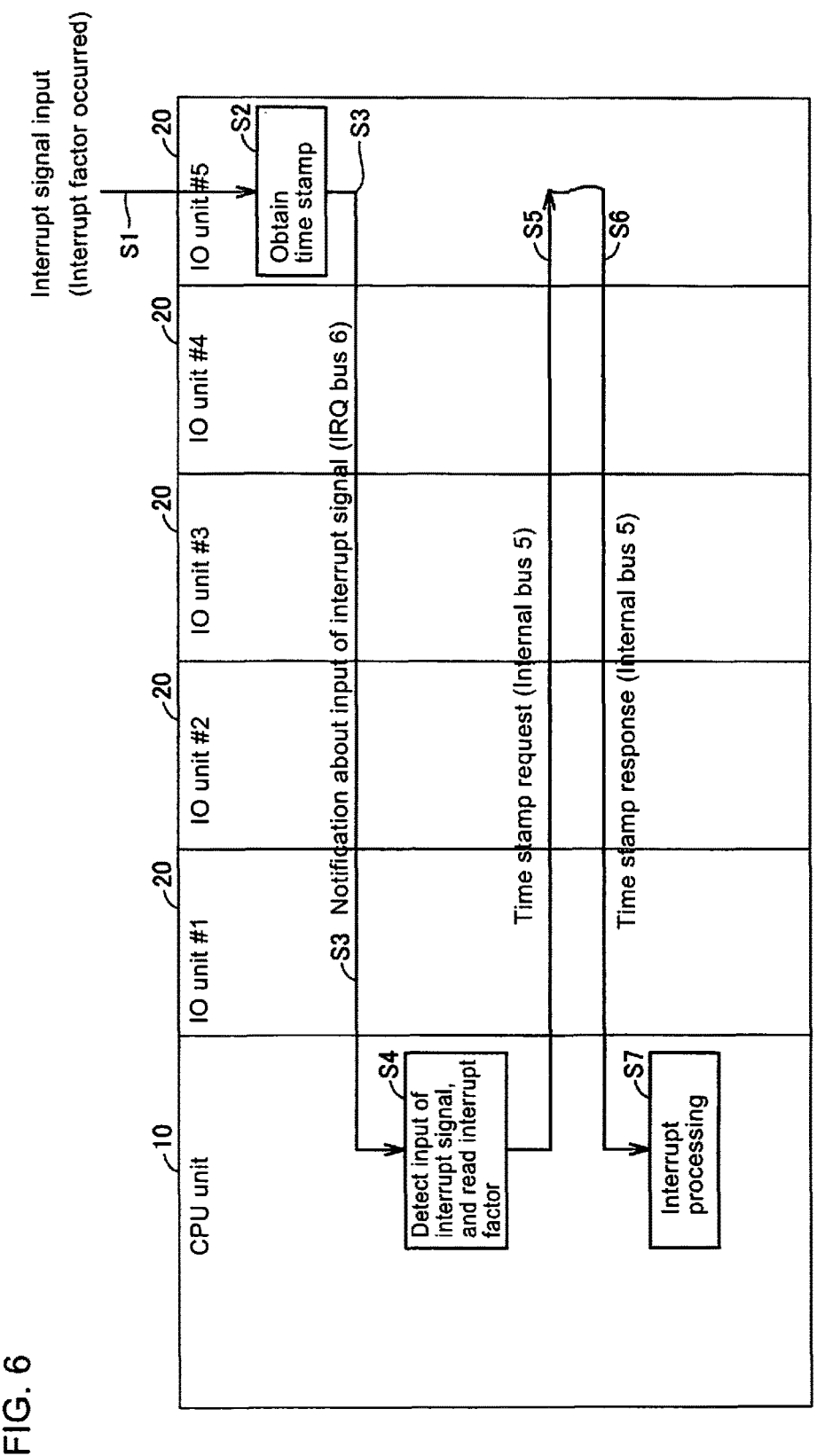
FIG. 6 is a diagram describing interrupt processing performed in the PLC system according to the embodiment of the present invention.

An overview of the interrupt processing performed in the PLC system 1 according to the present embodiment will now be described with reference to FIG. 6. FIG. 6 is a diagram describing the interrupt processing in the PLC system 1 according to the present embodiment.

The CPU unit 10, which is a master control unit, and the IO units 20, which are slave control units, are connected to one another with the internal bus 5, which is a communication line, and the IRQ bus 6, which is an interrupt line. Each of the IO units 20 includes a timer (counter 270), which is synchronized with the CPU unit 10, and an input unit (IO module 206) for receiving an interrupt signal. When the IO unit 20 receives an interrupt signal through its input unit, the IO unit 20 obtains timing information from its timer, and transmits notification about the input of the interrupt signal to the master control unit via the interrupt line. When receiving a request from the master control unit via the communication line, the IO unit 20 transmits the obtained timing information to the master control unit via the communication line.

Referring now to FIG. 6 showing the interrupt procedure, when an interrupt signal is input into one of the IO units 20 (step S1), the IO unit 20 obtains a time stamp (step S2). More specifically, when an interrupt factor occurs and changes the input value from OFF to ON (or from ON to OFF), the count value retained in the counter 270 at the timing of change is obtained as a time stamp. The interrupt signal (interrupt factor) may not be an externally input signal but may be an internal signal generated in any of these units.

The obtained time stamp is temporarily stored in the IO unit 20. The IO unit 20 that has received the input interrupt signal changes its status value to a value indicating that an interrupt factor has occurred. Typically, the value of the corresponding internal flag is updated. For ease of explanation, the time stamp is used as timing information at which an interrupt signal is input. This may be any information that can determine the timing at which an interrupt signal is input.

After the time stamp is obtained or in parallel with when the time stamp is obtained, the IO unit 20 transmits notification about the input of the interrupt signal to the CPU unit 10 via the IRQ bus 6, which is an interrupt line (step S3).

When receiving the notification (interrupt factor) about the input of the interrupt signal from any of the IO units 20, the CPU unit 10 identifies the IO unit 20 that has received the interrupt signal, and identifies the interrupt factor of the interrupt signal (step S4). The CPU unit 10 transmits a request for a time stamp to the IO unit 20 via the internal bus 5 (downlink 51) to obtain the timing at which the interrupt signal is input (step S5). In response to the request, the IO unit 20 that has received the input interrupt signal reads the internal time stamp, and transmits the time stamp to the CPU unit 10 via the internal bus 5 (uplink 52) (step S6).

The CPU unit 10 receives the time stamp from the IO unit 20, and uses the received time stamp in the interrupt processing (step S7).

To identify the IO unit 20 that has received the input interrupt signal, and identify the factor of the interrupt signal in step S4, the CPU unit 10 and the IO unit 20 may transmit and receive data between them. Various examples of such data transmission and reception will be described later.

E. Reducing Power Consumption in PLC System

A mechanism for reducing power consumption in the PLC system 1 according to the present embodiment will now be described. The transmission between the IO units 20 and the CPU unit 10 or the master unit 40 uses a sufficiently wide transmission bandwidth, which increases the clock frequency of the internal bus 5. As the clock frequency is higher, the components involved in transmission use larger power consumption. The PLC system 1 uses the internal bus 5, which includes independent links in different directions of data transmission. Such independent links may be used to achieve the mechanism for reducing power consumption. The mechanism for reducing power consumption is not directly associated with the gist of the present invention and is optional.

To reduce power consumption, one of the uplink and the downlink included in the internal bus 5 is placed in a standby status (deactivated) when no communication is being performed. The other link is basically maintained active irrespective of whether communication is being performed. The other link is used as necessary to activate the deactivated link. In one example, the uplink is activated or deactivated, because a command is more easily transmitted from the master control unit to the slave control units.

Figures 7A, 7B:
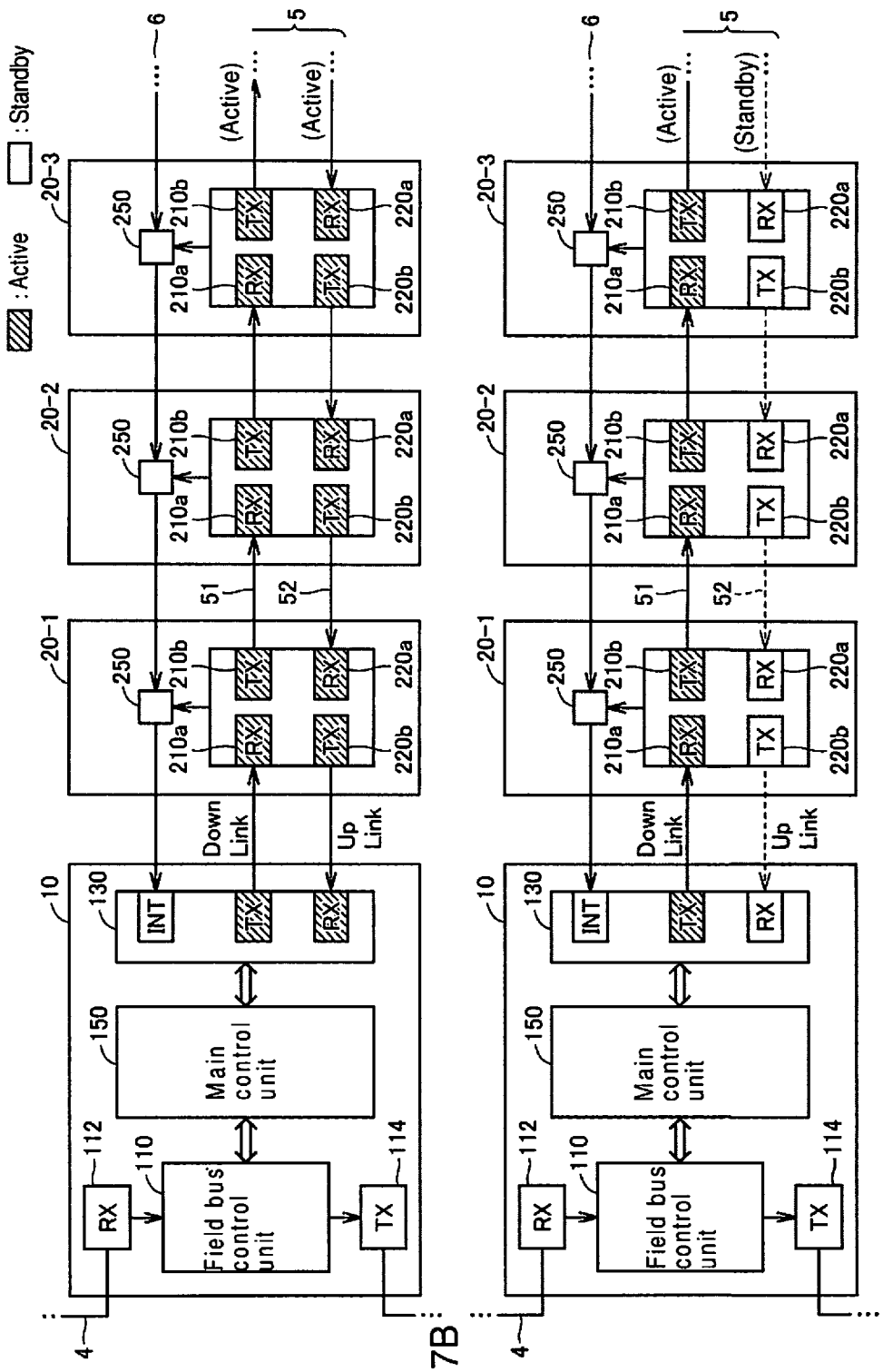
FIGS. 7A and 7B are diagrams describing a method for reducing power consumption in the PLC system according to the embodiment of the present invention.

FIGS. 7A and 7B are diagrams describing a technique for reducing power consumption in the PLC system 1 according to the present embodiment. FIG. 7A shows an example in which the downlink 51 and the uplink 52 are both active. FIG. 7B shows an example in which the downlink 51 is maintained active and the uplink 52 is in a standby status. The state shown in FIG. 7B is maintained as long as possible to reduce power consumption.

In one example, the master control unit (the CPU unit 10 or the master unit 40) transmits a command for deactivating the uplink 52 to the slave units (IO units 20) via the downlink 51 once the data transmission from the slave control units via the uplink 52 is complete, and transmits a command for activating the uplink 52 to the slave control units via the downlink 51 to obtain data from the slave control units. The slave control units (IO units 20) maintain the active downlink 51, and activate or deactivate the uplink 52 in accordance with a command transmitted from the master control unit via the downlink 51. In this manner, the downlink 51 is maintained active to easily control activation and deactivation of the uplink 52.

In the IO unit 20 shown in FIG. 5, the DES 222, the repeater unit 224, and the SER 226 may stop operating as appropriate. In particular, when the clock frequency of the internal bus 5 is relatively high (e.g., in the order of a few hundred megahertz to gigahertz or higher), these components have relatively high power consumption, and are thus stopped to reduce power consumption. In response to a command transmitted from the master control unit via the downlink 51, the processor 200 transmits an instruction to these components to operate or stop (an active/standby command) as described later. The IO units 20, which function as the slave control units, each include conversion circuits (the DES 222, the repeater unit 224, and the SER 226) for converting signals transmitted via the uplink 52. Deactivating the uplink 52 includes cutting power supply to these conversion circuits.

The master control unit (the CPU unit 10 or the master unit 40) further includes a reception circuit for receiving signals transferred on the uplink 52 (a reception circuit in the internal bus control unit 130). Deactivating the uplink 52 also cuts power supply to this reception circuit. This reduces power consumption of the CPU unit 10, in addition to reducing power consumption of the IO units 20.

While being deactivated, the units consume no power for communication. This reduces power consumption.

Subsequently, the master control unit (the CPU unit 10 or the master unit 40) receives notification about an input of an interrupt signal from the slave control unit (IO unit 20) via the interrupt line (IRQ bus 6), and transmits a command for activating the uplink 52 to the slave control unit via the downlink 51.

FIGS. 8A and 8B are timing charts each showing a procedure for reducing power consumption in the PLC system 1 according to the present embodiment. FIG. 8A shows a processing example in which the master control unit transmits a request to the slave control unit to transmit data collected by the slave control unit (IO module 206 shown in FIG. 5) (hereafter may be referred to as IN data) to the master control unit while the uplink 52 is deactivated. FIG. 8B shows a processing example in which the master control unit transmits data to be output from the slave control unit (IO module 206 in FIG. 5) (hereafter may be referred to as OUT data) to the slave control unit while the uplink 52 is deactivated.

Hereafter, the operation to transmit a request for IN data to the slave control unit may be referred to as IN data refresh, whereas the operation to transmit OUT data to the slave control unit may be referred to as OUT data refresh.

In the IN data refresh shown in FIG. 8A, the master control unit first transmits a data frame (hereafter may be referred to as WakeUP_frame) 302 including a command for activating the reception unit 220a and the transmission unit 220b in a standby state via the downlink 51. The slave control unit receives the frame WakeUP_frame 302, and changes the state of the uplink 52 from the deactivated state to the active state.

In addition to the frame WakeUP_frame 302, the master control unit transmits a data frame (hereafter may be referred to as TRG_frame (IN)) 304 including a command (trigger) for performing the IN data refresh via the downlink 51. In response to the frame TRG_frame (IN) 304, the slave control unit generates a frame IN_frame 314 including IN data obtained in its IO module, and transmits the frame IN_frame 314 to the master control unit via the uplink 52.

Once the reception of the frame IN_frame 314 from the slave control unit is complete, the master control unit transmits a data frame (hereafter may be referred to as PowerDown_frame) 308 including a command for deactivating the reception unit 220a and the transmission unit 220b in the active state via the downlink 51. The slave control unit receives the frame PowerDown_frame 308, and changes the state of the uplink 52 from the active state to the deactivated state.

In this manner, the uplink 52 is activated for the period in which the IN data refresh is performed, and is otherwise maintained in the deactivated state. This procedure reduces power consumption.

In the OUT data refresh shown in FIG. 8B, the master control unit first transmits a frame WakeUP_frame 302 via the downlink 51. The slave control unit receives the frame WakeUP_frame 302, and changes the state of the uplink 52 from the deactivated state to the active state. Subsequently, the master control unit generates a frame OUT_frame 306 including OUT data, and transmits the frame OUT_frame 306 to the slave control unit via the downlink 51.

When completing the reception of the OUT_frame 306 from the master control unit, the slave control unit transmits a data frame (hereafter may be referred to as ACK_frame) 316 indicating successful reception of the frame OUT_frame 306 via the uplink 52. When receiving the frame ACK_frame 316 from the slave control unit, the master control unit determines that the OUT refresh has been successful, and transmits a frame PowerDown_frame 308 via the downlink 51. The slave control unit receives the frame PowerDown_frame 308, and changes the state of the uplink 52 from the active state to the deactivated state.

In this manner, the uplink 52 is activated for the period in which the OUT data refresh is performed, and is otherwise maintained in the deactivated state. This procedure reduces power consumption.

Although the data transmission and reception between the master control unit and one slave control unit is described with reference to FIGS. 8A and 8B, the subsequent slave control units may receive frames transmitted sequentially, and may perform the same processing as described above. More specifically, data may be transmitted (multicast or broadcast) to all the slave control units connected to the master control unit at one time. In this case, all the slave control units perform the same processing.

A specific slave control unit may perform intended processing with message transfer or other methods.

F. Procedure at Interrupt Signal Input (First Example)

A procedure performed in response to an input of an interrupt signal in the PLC system 1 according to the present embodiment will now be described.

Figure 9:
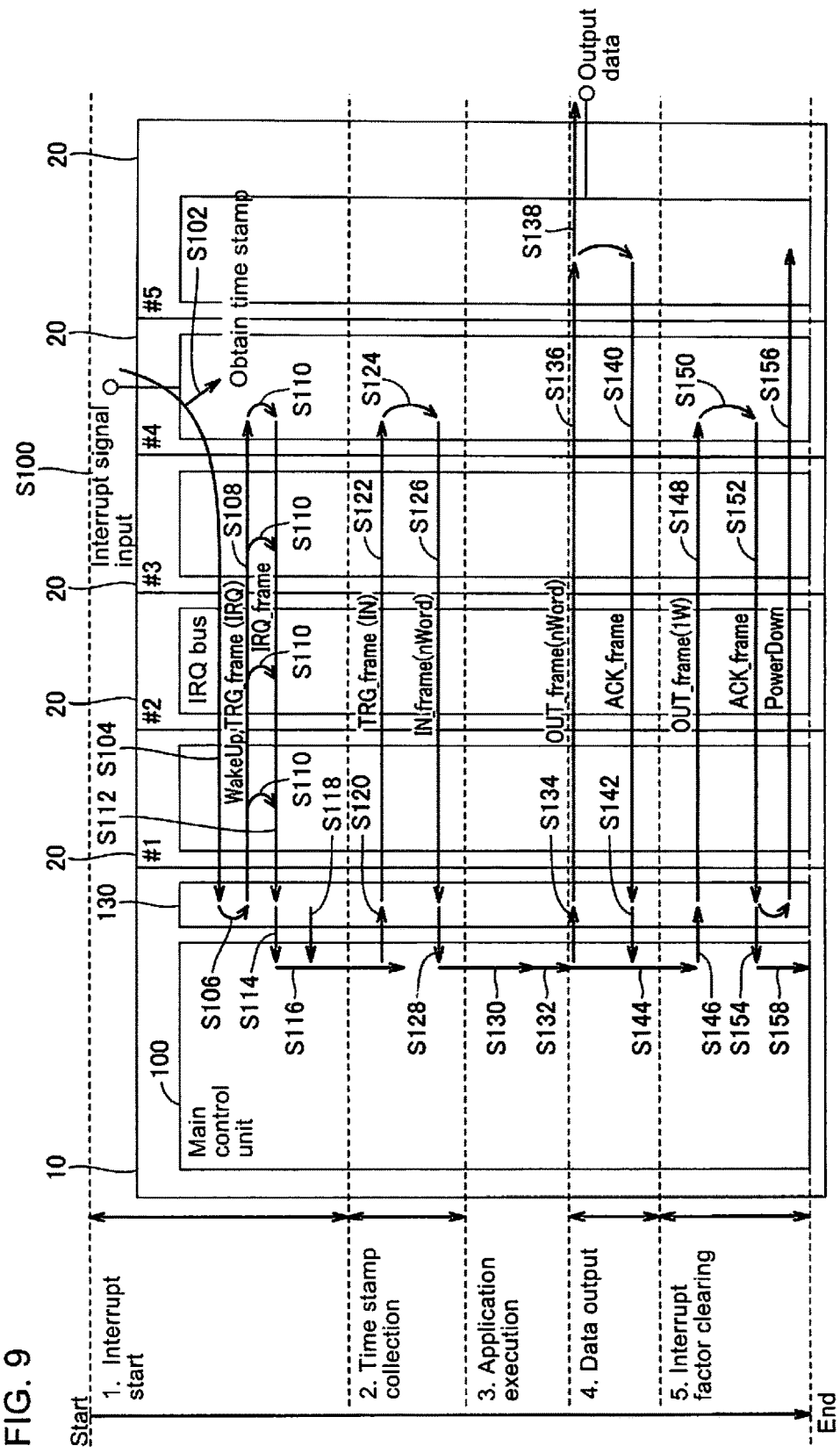
FIG. 9 is a timing chart showing a procedure performed in response to an interrupt signal input into the PLC system (a first example) according to the embodiment of the present invention.

FIG. 9 is a timing chart showing a procedure performed in response to an input of an interrupt signal in the PLC system 1 according to the present embodiment (first example). As shown in FIG. 9, the procedure includes five phases: interrupt start, time stamp collection, application execution, data output, and interrupt factor clearing.

In the first interrupt start phase, any of the IO units 20 receives an interrupt signal via the IO module 206 (step S100), and then obtains the time stamp at the input timing of the interrupt signal (step S102). More specifically, the IO unit 20 obtains timing information from its timer. The IO unit 20 then transmits notification about the input of the interrupt signal to the CPU unit 10 (master control unit) via the IRQ bus 6 (interrupt line) (step S104).

In response to the notification about the input of the interrupt signal via the IRQ bus 6, the internal bus control unit 130 included in the CPU unit 10 generates frames for identifying the IO unit 20 that has received the input interrupt signal (step S106). The internal bus control unit 130 of the CPU unit 10 transmits the generated frames to the IO units 20 via the downlink 51 (step S108). The generated frames include a frame WakeUP_frame for changing the state to an active state and a data frame including a command (trigger) for requesting the input status of the interrupt signal (hereafter may be referred to as TRG_frame (IRQ)). When receiving the notification about the input of the interrupt signal, the internal bus control unit 130 of the CPU unit 10 has yet to identify the IO unit 20 that has transmitted the interrupt signal. The internal bus control unit 130 broadcasts the generated frames. The internal bus control unit 130 may multicast the generated frames to IO units 20 that may transmit notification about an interrupt signal.

The IO unit 20 that has previously transmitted notification about an interrupt signal and received the frame TRG_frame (IRQ) reads the input status of its interrupt signal (step S110). The IO unit 20 then transmits the input status to the CPU unit 10 as a frame IRQ_frame (step S112).

The frame TRG_frame (IRQ) may be transmitted (multicast) only to the IO units 20 that receive an input of an interrupt signal. More specifically, the limited slave control units that are enabled to transmit notification about an input of an interrupt signal may receive the request (TRG_frame (IRQ)) transmitted from the master control unit via the communication line.

In the example shown in FIG. 9, the frame TRG_frame (IRQ) is transferred to the IO units 20 #1 to #4. The frame TRG_frame (IRQ) may be transferred to a limited range of destinations in this manner by assigning an attribute (identification number) to the generated frame TRG_frame (IRQ) and providing each IO unit 20 with information about the attribute of the frame to be received in advance.

The internal bus control unit 130 of the CPU unit 10 updates the interrupt factor based on the frame IRQ_frame from each IO unit 20. The internal bus control unit 130 of the CPU unit 10 transmits notification about the interrupt factor to the main control unit 100 of the CPU unit 10 (step S114). The main control unit 100 of the CPU unit 10 activates an interrupt task in response to the notification about the interrupt factor (step S116).

The interrupt factor indicates the input status of an interrupt signal in each of the IO units 20, and is typically retained as a flag value set separately for each IO unit 20. The interrupt task performed in the main control unit 100 of the CPU unit 10 includes reading the interrupt factor from the internal bus control unit 130, identifying the IO unit 20 that has received the input interrupt signal (in which the interrupt factor occurs), and reading this interrupt factor (step S118).

In the second time stamp collection phase, the main control unit 100 of the CPU unit 10 instructs the internal bus control unit 130 to perform IN data refresh for collecting, from the IO unit 20 that has received the interrupt signal, a time stamp indicating the timing at which the interrupt signal is input (step S120). In response to this instruction, the internal bus control unit 130 of the CPU unit 10 generates and transmits a frame TRG_frame (IN) via the downlink 51 (step S122). At this timing, the IO unit 20 receiving the input interrupt signal has already been identified. Thus, the main control unit 100 of the CPU unit 10 transmits the frame TRG_frame (IN) toward the identified IO unit 20. The IO unit 20 receives the frame TRG_frame (IN), and reads its input value (step S124). The IO unit 20 transmits the input value to the CPU unit 10 as a frame IN_frame (nWord) including IN data for n words (step S126). The frame IN_frame (nWord) includes the input value (current value) input into the IO module 206, the status value indicating the input status of the interrupt signal, and the time stamp value. The internal bus control unit 130 of the CPU unit 10 passes the frame IN_frame (nWord) from the IO unit 20 to the main control unit 100 of the CPU unit 10 (step S128).

In the third application execution phase, the main control unit 100 of the CPU unit 10 executes an interrupt application in accordance with the interrupt factor (e.g., the IO unit 20 that has received the input interrupt signal or the type of the interrupt signal) (step S130). The main control unit 100 prepares for transmitting the execution result (step S132).

In the fourth data output phase, the main control unit 100 of the CPU unit 10 instructs the internal bus control unit 130 to perform OUT data refresh for outputting the OUT data in accordance with the execution result (step S134). In response to this instruction, the internal bus control unit 130 of the CPU unit 10 generates a frame OUT_frame (nWord), and transmits the generated frame OUT_frame (nWord) via the downlink 51 to the IO unit 20 that outputs data (step S136). In this example, the frame OUT_frame (nWord) is transmitted to the IO unit 20 #5.

The IO unit 20 that has received the frame OUT_frame (nWord) outputs the OUT data from the IO module 206 in accordance with the received frame OUT_frame (nWord) (step S138), and transmits a frame ACK_frame indicating successful reception of the frame OUT_frame (nWord) to the CPU unit 10 via the uplink 52 (step S140). The internal bus control unit 130 of the CPU unit 10 receives the frame ACK_frame from the IO unit 20, and transmits notification about the completion of the OUT data refresh to the main control unit 100 of the CPU unit 10 (step S142).

The frame OUT_frame (nWord) may include a time stamp indicating the timing at which the OUT data is to be output, in addition to the OUT data to be output. When receiving the frame OUT_frame (nWord) including the time stamp, the IO unit 20 outputs the OUT data at the time indicated by the time stamp.

In the fifth interrupt factor clearing phase, the main control unit 100 of the CPU unit 10 prepares for instructing the IO unit 20 that has received the input interrupt signal to clear the interrupt factor (step S144). More specifically, the main control unit 100 prepares for clearing the status value retained in the IO unit 20 that has received the interrupt signal. Subsequently, the main control unit 100 of the CPU unit 10 instructs the internal bus control unit 130 to clear the interrupt factor in the IO unit 20 (step S146). In response to this instruction, the internal bus control unit 130 of the CPU unit 10 generates a frame OUT_frame (1 W), and transmits the frame OUT_frame (1 W) via the downlink 51 to the IO unit 20 that has received the interrupt signal (IO unit 20 #4 in this example) (step S148). The IO unit 20 that has received the frame OUT_frame (1 W) clears the status value indicating its internally retained interrupt factor to zero (step S150), and transmits a frame ACK_frame indicating successful reception of the OUT_frame (1 W) to the CPU unit 10 via the uplink 52 (step S152). The internal bus control unit 130 of the CPU unit 10 receives the ACK_frame from the IO unit 20, and transmits notification about the completion of the interrupt factor clearing to the main control unit 100 of the CPU unit 10 (step S154). Additionally, the internal bus control unit 130 generates a frame PowerDown_frame for deactivating the uplink 52, and transmits the frame PowerDown_frame to all the IO units 20 via the downlink 51 (step S156). Upon receipt of the frame PowerDown_frame, each IO unit 20 deactivates the uplink.

The main control unit 100 of the CPU unit 10 ends the interrupt task in response to the completion of clearing of the interrupt factor (step S158). This completes the interrupt processing performed after the input of the interrupt signal.

G. Procedure at Input of Interrupt Signal (Second Example)

Figure 10:
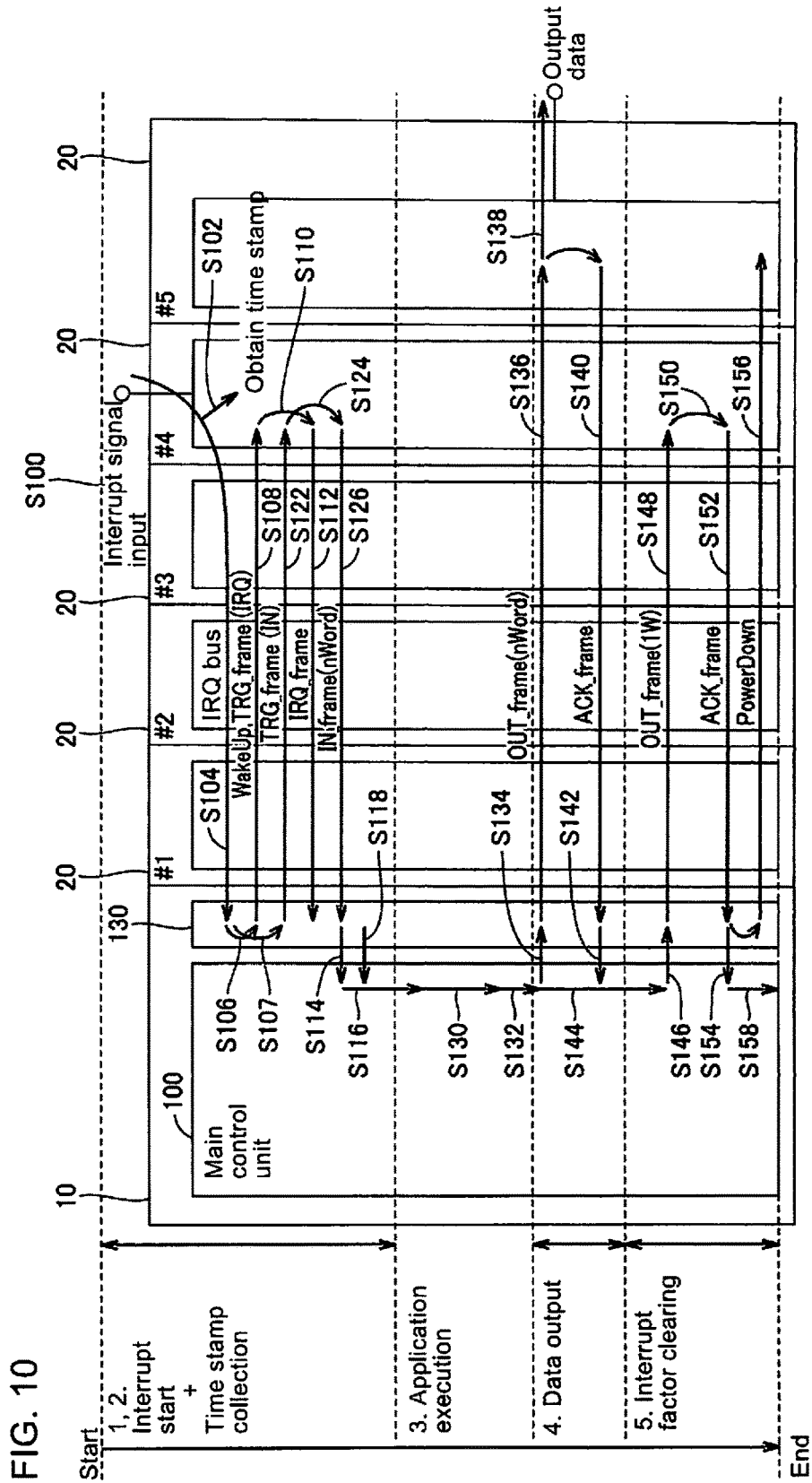
FIG. 10 is a timing chart showing a procedure performed in response to an interrupt signal input into the PLC system (a second example) according to the embodiment of the present invention.

A procedure for performing the first and second phases in parallel will now be described as a modification of the first example (second example). FIG. 10 is a timing chart showing a procedure performed in response to an input of an interrupt signal in the PLC system 1 according to the present embodiment (second example).

The procedure shown in FIG. 10 differs from the procedure shown in FIG. 9 in the timing at which the frame WakeUP_frame for changing the state to an active state and the frame TRG_frame (IRQ) including a command (trigger) for requesting the input status of an interrupt signal are transmitted (step S122). When receiving notification about an input of an interrupt signal in the second example, the internal bus control unit 130 of the CPU unit 10 generates a frame for identifying the IO unit 20 that has received the interrupt signal (step S106), and also generates a frame TRG_frame (IN) for collecting a time stamp from the IO unit 20 that has received the interrupt signal (step S107).

The IO unit 20 transmits the target data to the CPU unit 10 in response to each frame (steps S112 and S126).

This procedure shortens the time taken for the interrupt processing.

H. Procedure at Input of Interrupt Signal (Third Example)

Figure 11:
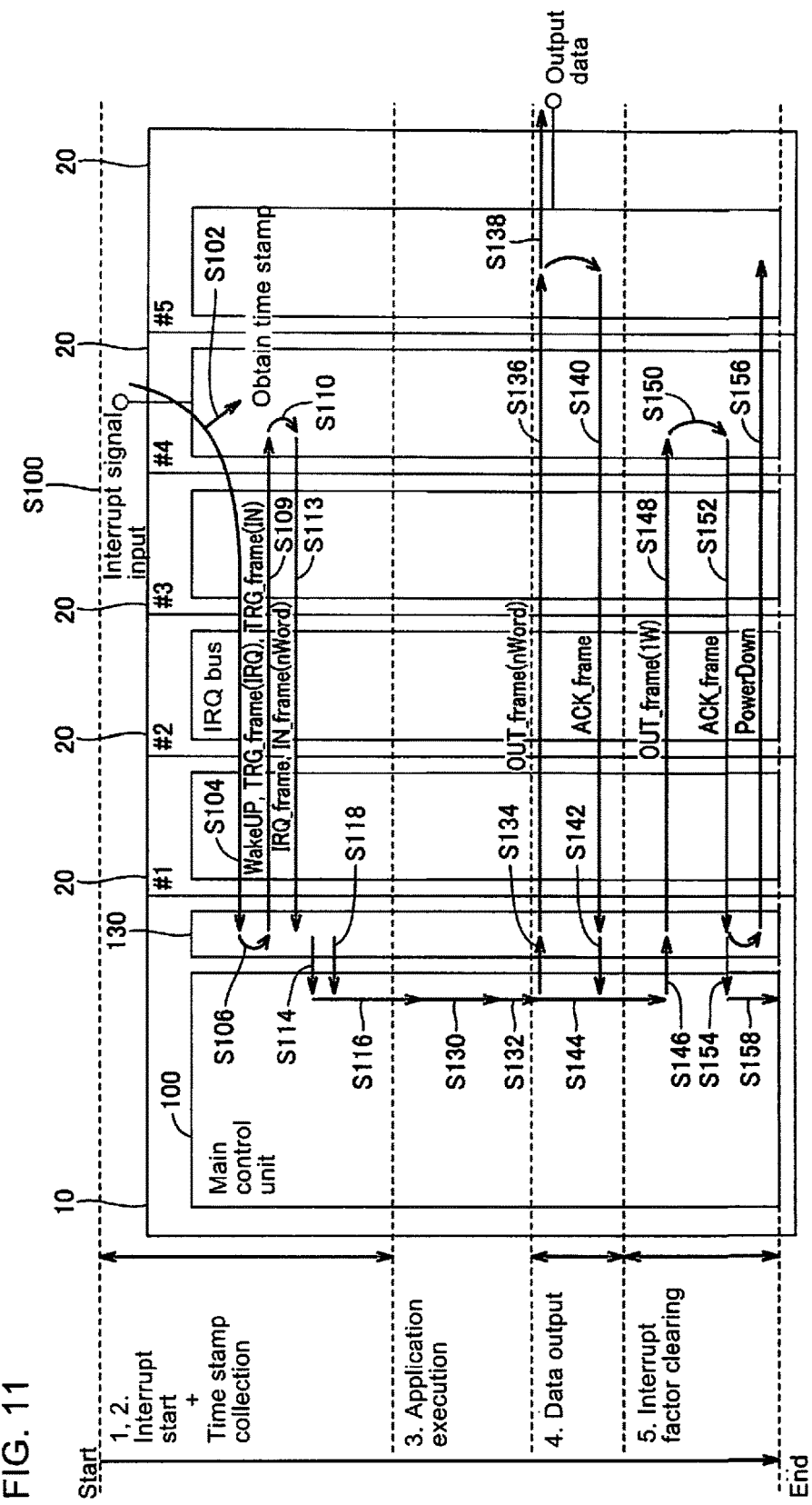
FIG. 11 is a timing chart showing a procedure performed in response to an interrupt signal input into the PLC system (a third example) according to the embodiment of the present invention.

A procedure for performing communication in the first and second phases in one step will now be described as another modification of the first example (third example). FIG. 11 is a timing chart showing a procedure performed in response to an input of an interrupt signal in the PLC system 1 according to the present embodiment (third example).

The procedure shown in FIG. 11 differs from the procedure shown in FIG. 10 in transmitting the frame WakeUP_frame for changing the state to an active state, the frame TRG_frame (IRQ) including a command (trigger) for requesting the input status of an interrupt signal, and the frame TRG_frame (IN) including a command (trigger) for performing IN data refresh (step S109) at one time. In the third example, the internal bus control unit 130 of the CPU unit 10 generates frames including the frame WakeUP_frame, the frame TRG_frame (IRQ), and the frame TRG_frame (IN) in response to notification about an input of an interrupt signal via the IRQ bus 6 (step S106), and transmits the generated frames via the downlink 51.

In response to these frames, the IO unit 20 generates frames IRQ_frame and IN_frame, and transmits these frames to the CPU unit 10 via the uplink 52 (step S113).

Through this procedure, information used for the interrupt processing is obtained from the IO unit 20 in one step of communication, and thus shortens the time taken for the processing further.

I. Interrupt Signal Notification to Limited IO Units

As described above, the PLC system 1 includes the IRQ bus 6, which connects the master control unit to the plurality of slave control units. For interrupt control, IO units 20 that can receive an interrupt signal are arranged near the CPU unit 10 to minimize the time taken to transmit an interrupt signal. In this case, the limited IO units 20 that are near the CPU unit 10 are enabled to receive an interrupt signal, whereas the other IO units 20 receive no interrupt signal. This scheme prevents erroneous notification about an input of an interrupt signal caused by an erroneous operation due to noise in the IRQ bus 6.

In other words, the main processing device 2 and/or the remote IO device 3 may include a unit for limiting slave control units that are enabled to transmit notification about an input of an interrupt signal to the master control unit.

More specifically, a maximum of n IO units 20 arranged near the CPU unit 10 may be enabled to receive an interrupt signal. In this case, erroneous notification from the (n+1)th or subsequent IO units 20 via the IRQ bus 6 is to be prevented. To prevent transmission of such erroneous notification, the system may include interrupt notification circuits 250 (FIG. 2) with the circuit configuration described below.

Figure 12:
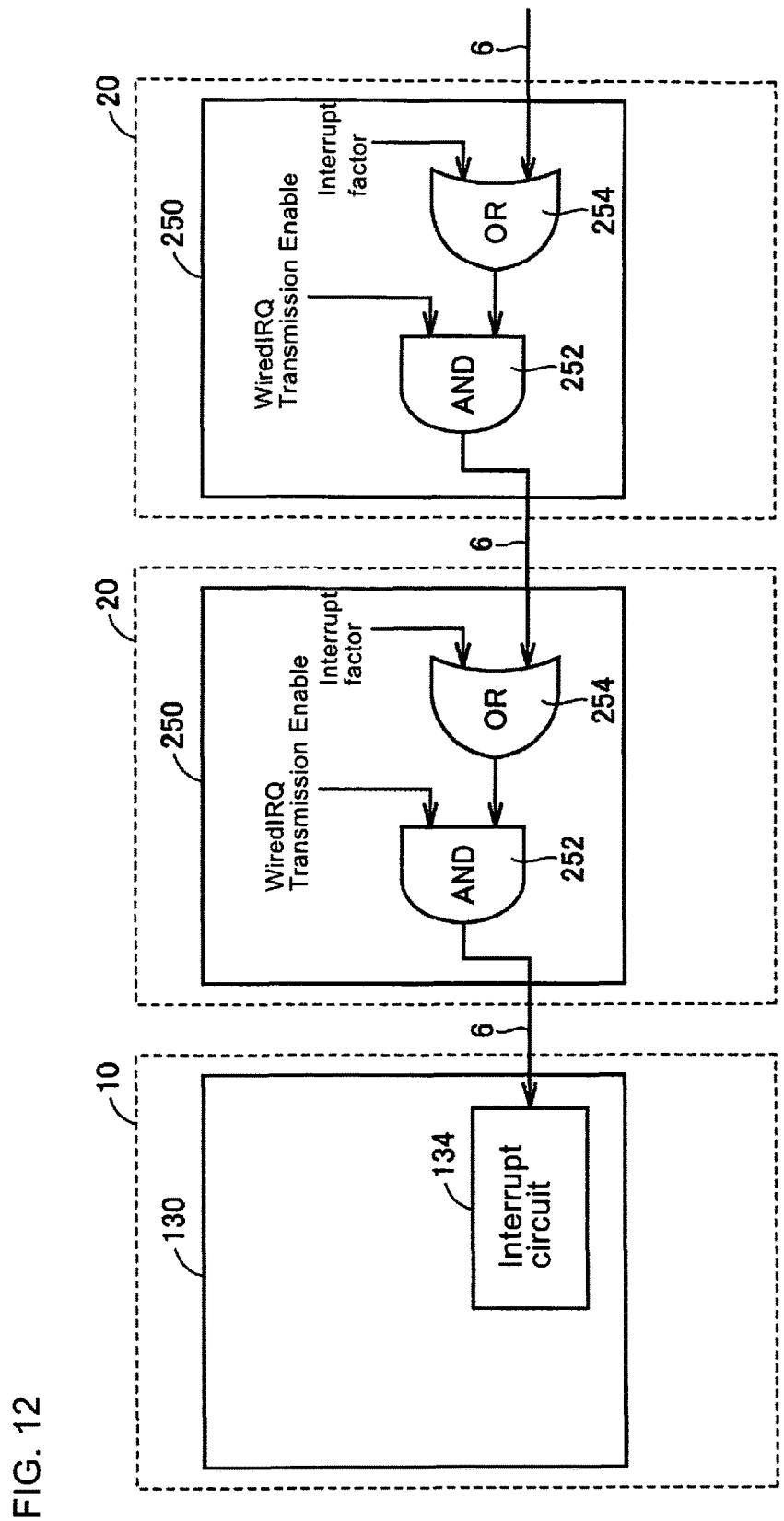
FIG. 12 is a schematic diagram showing an example circuit configuration that prevents transmission of erroneous notification on an IRQ bus in the PLC system according to the embodiment of the present invention.

FIG. 12 is a schematic diagram showing an example circuit configuration that prevents transmission of erroneous notification on the IRQ bus 6 in the PLC system 1 according to the present embodiment. As shown in FIG. 12, the interrupt notification circuit 250 in each IO unit 20 includes an AND circuit 252 and an OR circuit 254. The OR circuit 254, which is arranged on the IRQ bus 6 (interrupt line), outputs the logical sum of a notification signal indicating an input of an interrupt signal from the preceding slave control unit, and a notification signal indicating an input of its interrupt signal as a notification signal indicating an input of a new interrupt signal. The AND circuit 252 corresponds to a circuit for determining whether to output a notification signal indicating an input of a new interrupt signal output from the OR circuit 254 to the subsequent slave control unit.

The OR circuit 254 has one input terminal connected to the IRQ bus 6 extending from its adjacent IO unit 20, and has another input terminal receiving an input interrupt factor (the input status of an interrupt signal). The OR circuit 254 outputs a notification signal indicating an interrupt factor when at least receiving notification about an input of an interrupt signal from the adjacent IO unit 20 or detecting an interrupt factor occurring in the IO unit 20 including this OR circuit 254.

The OR circuit 254 has its output connected to one input terminal of the AND circuit 252. The other input terminal of the AND circuit 252 receives a WiredIRQ Transmission Enable signal for controlling whether to allow transmission on the IRQ bus 6. More specifically, the AND circuit 252 outputs no valid signal when the WiredIRQ Transmission Enable signal is not enabled (activated). In other words, disabling (deactivating) the WiredIRQ Transmission Enable signal prevents notification from being transmitted from the IO unit 20 and subsequent IO units 20.

To prevent erroneous notification from the (n+1)th and subsequent IO units 20 from being transmitted on the IRQ bus 6, the WiredIRQ Transmission Enable signal is enabled (activated) for the n IO units 20 arranged near the CPU unit 10, whereas the WiredIRQ Transmission Enable signal is disabled (inactivated) for the other remaining IO units 20. This configuration and this setting prevent erroneous notification from being transmitted via the IRQ bus 6.

J. Modifications

In the above embodiments, the CPU unit 10 and the IO units 20 are connected to one another with the communication line (internal bus 5) and the interrupt line (IRQ bus 6). In some embodiments, the information indicating an input of an interrupt signal may not be transmitted via the interrupt line but may be transmitted via the communication line. The configuration to transmit the information indicating an input of an interrupt signal to the main processing device via the communication line will now be described.

Figure 13:
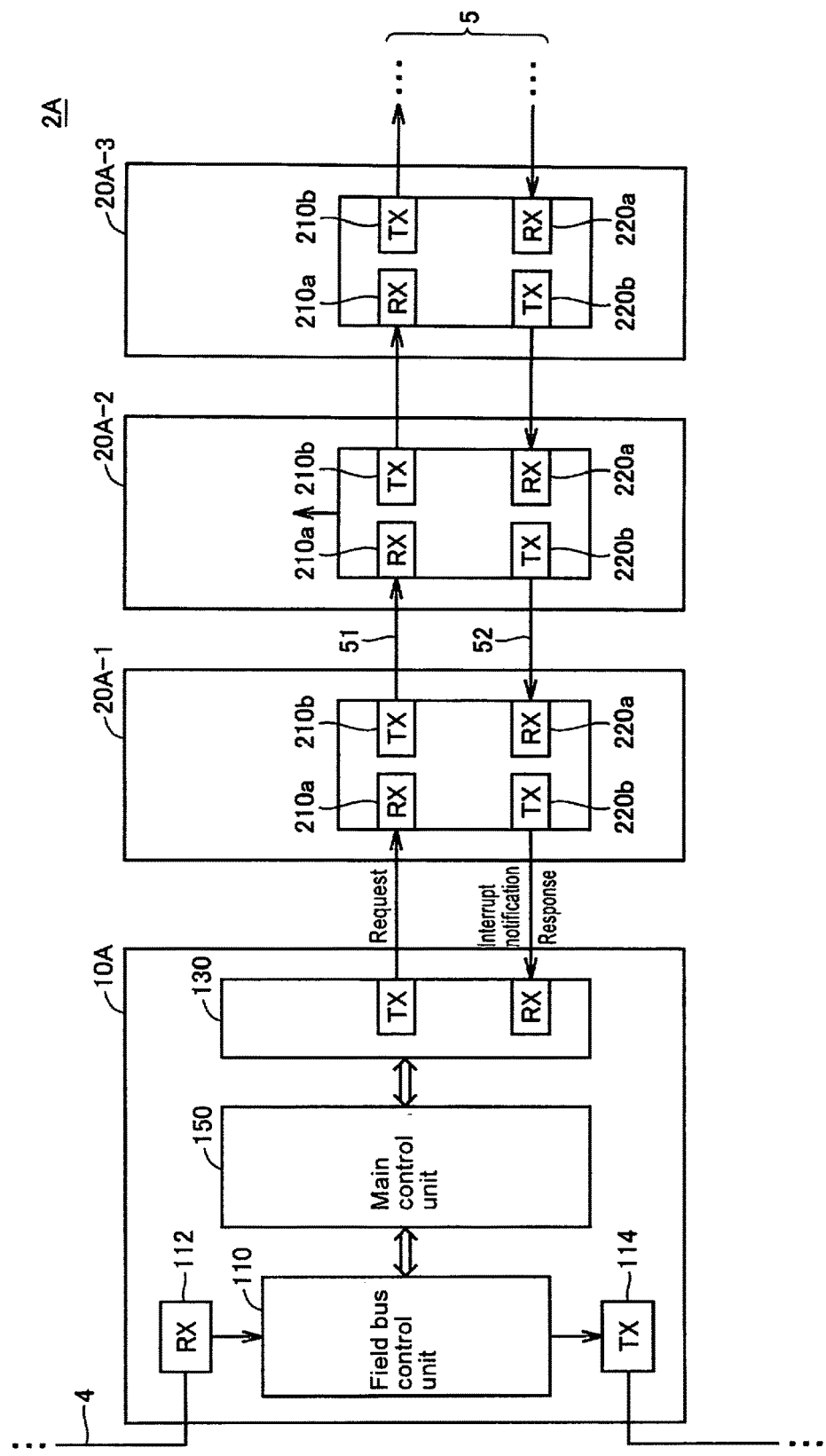
FIG. 13 is a schematic diagram of a main processing device according to another embodiment of the present invention.

FIG. 13 is a schematic diagram of a main processing device 2A according to another embodiment of the present invention. The main processing device 2A includes a CPU unit 10A and IO units 20A connected to one another with a communication line (internal bus 5), but eliminates the IRQ bus 6. In this modification, the CPU unit 10A and the IO units 20A eliminate their functions associated with signal transmission via the IRQ bus 6.

In the main processing device 2A, the IO units 20A transmit notification about an input of an interrupt signal to the CPU unit 10A with a method described below. The method includes autonomously generating a data frame (command) including notification about an input of an interrupt signal and transmitting the data frame (command) to the CPU unit 10A via the communication line (internal bus 5). The CPU unit 10A can identify the IO unit 20A that has transmitted the data frame (command) based on this command, and transmits a request for a time stamp to the identified IO unit 20A. The IO unit 20A that has received the request transmits the requested time stamp to the CPU unit 10A via the communication line (internal bus 5). In this manner, the slave control units (IO units 20A) transmit information indicating an input of an interrupt signal to the master control unit (CPU unit 10A) via the communication line (internal bus 5).

The IO unit 20A transmits notification about an input of an interrupt signal to the CPU unit 10A with another method, which is for example polling performed from the CPU unit 10A. More specifically, the CPU unit 10A performs regular and cyclic polling to each IO unit 20A via the internal bus 5. Each IO unit 20A receiving polling from the CPU unit 10A may transmit notification about an input of an interrupt signal. More specifically, in response to polling from the CPU unit 10A, each IO unit 20A may transmit notification about an input of an interrupt signal when an interrupt signal has been received during a period from the previous polling to the current polling. With polling, the CPU unit 10A can detect an interrupt signal input in any IO unit 20A.

As described above, the master control unit (CPU unit 10A) periodically transmits an inquiry to the slave control unit (IO unit 20A) via the communication line (internal bus 5). Each slave control unit (IO unit 20A) receiving an inquiry from the master control unit (CPU unit 10A) then transmits information indicating an input of an interrupt signal to the master control unit (CPU unit 10A) when it has received the interrupt signal.

Notification about an input of an interrupt signal may be transmitted via the communication line (internal bus 5) with any method other than the method described above.

K. Advantages

The present embodiment allows determination of the timing at which an interrupt factor has occurred in interrupt processing, and thus allows more appropriate control of the execution timing of various programs associated with the interrupt processing. For example, the embodiment easily allows control for outputting a signal in a predetermined period after an interrupt factor has occurred.

The present embodiment identifies the timing at which each interrupt factor has occurred when the slave control units each have an interrupt factor, and thus can be used to investigate the cause of a failure occurring to a control target.

The embodiments disclosed herein are only illustrative in all respects and should not be construed to be restrictive. The scope of the invention is designated by the appended claims, and it is intended that all changes are contained in the claims and equivalent meanings and ranges.

REFERENCE SIGNS LIST

1 PLC system
2 main processing device
3 remote IO device
4 field bus
5 internal bus
6 IRQ bus
10 CPU unit
12, 42 communication module
20 IO unit
30 power supply unit
40 master unit
51 downlink
52 uplink
100, 150 main control unit
102, 152, 200 processor
104, 208 nonvolatile memory
106 control program
108 main memory
110 field bus control unit
112, 210a, 220a reception unit
114, 210b, 220b transmission unit
120 field bus communication controller
122 memory controller
124 FIFO memory
126, 203 reception buffer
128, 204 transmission buffer
130 internal bus control unit
132 internal bus communication controller
134 interrupt circuit
136, 270 counter
142 transmission circuit
144 reception circuit
160 storage unit
162, 202 shared memory
164 reception memory
166 transmission memory
206 module
212, 222 DES
214, 224 repeater unit
216, 226 SER
230 reception processing unit
232 decoder
234 checker
236 bus
240 transmission processing unit
242 CRC generator
244 encoder
250 interrupt notification circuit
252 AND circuit
254 OR circuit

The invention claimed is:

1. A controller constituting at least a portion of a control system, the controller comprising:
a master control unit; and
slave control units connected to the master control unit with at least a communication line and a common interrupt line, wherein:
the slave control units each comprise a timer that is synchronized with the master control unit, and a processor configured with a program to perform operations comprising:
receiving an input of an interrupt signal,
obtaining, upon receipt of the input of the interrupt signal, timing information from the timer indicating the time of the input of the interrupt signal, and to transmit a notification about the input of the interrupt signal to the master control unit on the common interrupt line, and
transmitting, upon receipt of a request from the master control unit via the communication line, the timing information to the master control unit via the communication line; and
the master control unit comprises a processor configured with a program to perform operations comprising:
sending the request via the communication line, to all of the slave control units upon receipt, on the common interrupt line, of the notification about the input of the interrupt signal from ones of the slave control units for which the input of the interrupt signal is received;
responsive to the sending the request via the communication line, receiving the timing information via the communication line from the ones of the slave control units for which the input of the interrupt signal is received, the receipt of the timing information identifying to the master control unit the ones of the slave control units for which the input of the interrupt signal has been received; and
performing interrupt processing according to the received timing information and the identification of the ones of the slave control units for which the input of the interrupt signal has been received so as to transmit a result of the interrupt processing to the slave control units within a predetermined time.

2. The controller according to claim 1, wherein the processor of the master control unit is configured with the program to perform operations further comprising:
sending a first message over the communication line, to the slave control units in response to receiving the notification on the common interrupt line, the first message requesting an interrupt status of each of the slave control units, the interrupt status indicating whether or not the interrupt signal has been received and an interrupt factor of the interrupt signal;
in response to receipt of the first message by the slave control units, the processor of each of the slave control units is further configured with the program to perform operations comprising:
determining the interrupt status of the respective slave control unit; and
transmitting a first response containing the interrupt status for the respective slave control unit to the master control unit over the communication line;
the processor of the master control unit is further configured with the program to perform operations comprising:
receiving the first response including the interrupt status transmitted from each of the slave control units;
sending a second message comprising the request over the communication line, to ones of the slave control units for which the interrupt status indicates that the input of the interrupt signal has been received, the second message requesting at least the timing information from each of the ones of the slave control units for which the interrupt status indicates that the input of the interrupt signal has been received;
in response to receipt of the second message by the ones of the slave control units for which the interrupt status indicates that the input of the interrupt signal has been received, the processor of each of the ones of the slave control units is further configured with the program to perform operations such that transmitting, upon receipt of the request from the master control unit via the communication line, the timing information to the master control unit via the communication line, comprises transmitting a second response containing at least the timing information and input data associated with respective slave control unit;
receiving the second response including at least the timing information transmitted from each of the ones of the slave control units for which the interrupt status indicates that the input of the interrupt signal has been received; and
performing the interrupt processing according to the interrupt status, including the interrupt factor, the timing information and the input data in the second response received from each of the slave control units.

3. The controller according to claim 2, wherein each of the slave control units comprises:
an OR circuit arranged on the common interrupt line and configured to output, as a notification signal indicating an input of a new interrupt signal, a logical sum of a notification signal indicating an input of an interrupt signal received from a preceding one of the slave control units, and a notification signal indicating an input of an interrupt signal in the slave control unit including the OR circuit, and
a circuit configured to determine whether to output the notification signal indicating the input of the new interrupt signal received from the OR circuit to a subsequent one of the slave control units.

4. The controller according to claim 1, wherein the processor of each of the slave control units is configured with the program to perform operations comprising transmitting information indicating the input of the interrupt signal to the master control unit via the communication line.

5. The controller according to claim 4, wherein the processor of the master control unit is further configured with the program to perform operations comprising periodically transmitting an inquiry to the slave control units via the communication line, and
in response to at least one of the slave control units having previously received the interrupt signal at reception of the inquiry from the master control unit, the at least one slave control unit transmits information indicating the input of the interrupt signal to the master control unit.

6. The controller according to claim 1, wherein the communication line further comprises a downlink configured to transmit data from the master control unit to the slave control units, and an uplink configured to transmit data from the slave control units to the master control unit, and
the processor of the master control unit is configured with the program to perform operations further comprising operation as a transmission unit configured to:
transmit a command for deactivating the uplink to the slave control units via the downlink upon completion of data transmission from the slave control units via the uplink; and,
transmit a command for activating the uplink to the slave control units via the downlink upon receipt of the notification about the input of the interrupt signal from the slave control units.

7. The controller according to claim 1, wherein a number of the slave control units that are enabled to transmit the notification about the input of the interrupt signal to the master control unit is limited.

8. The controller according to claim 7, wherein the request transmitted from the master control unit via the communication line is received by the limited number of slave control units that are enabled to transmit the notification about the input of the interrupt signal to the master control unit.

9. A control method implemented in a control system comprising a master control unit and slave control units connected to the master control unit with at least a communication line and a common interrupt line, the method comprising:
obtaining, in response to one or more of the slave control units receives an input of an interrupt signal through an input unit, timing information indicating a time of the input of the interrupt signal from a timer that is synchronized with the master control unit,
transmitting via the common interrupt line, a notification about the input of the interrupt signal to the master control unit;
transmitting the obtained timing information from the one or more of the slave control units to the master control unit via the communication line in response to the one or more of the slave control units receives a request from the master control unit via the communication line in response to receiving the notification over the common interrupt line, the timing information received by the master control unit from the one or more of the slave control units identifying to the master control unit ones of the one or more of the slave control units for which the input of the interrupt signal has been received; and performing interrupt processing for the interrupt received by the one or more of the slave control units according to the timing information and the identification of the ones of the one or more of the slave control units for which the input of the interrupt signal has been received so as to transmit a result of the interrupt processing to the ones of the one or more of the slave control units for which the interrupt signal was received within a predetermined time.

* * * * *